(12) United States Patent
Song et al.

(10) Patent No.: US 9,798,492 B2
(45) Date of Patent: Oct. 24, 2017

(54) SEMICONDUCTOR DEVICE INCLUDING A PLURALITY OF FUNCTION BLOCKS

(71) Applicant: SK hynix Inc., Gyeonggi-do (KR)

(72) Inventors: Kwang Jong Song, Gyeonggi-do (KR);
Dae Geun Jee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 594 days.

(21) Appl. No.: 14/483,912

(22) Filed: Sep. 11, 2014

(65) Prior Publication Data
US 2015/0293721 A1    Oct. 15, 2015

(30) Foreign Application Priority Data

Apr. 15, 2014  (KR) .......................... 10-2014-0044925

(51) Int. Cl.
*G06F 3/06*    (2006.01)
*G06F 12/02*   (2006.01)

(52) U.S. Cl.
CPC ............ *G06F 3/0656* (2013.01); *G06F 3/061* (2013.01); *G06F 3/0673* (2013.01); *G06F 12/0246* (2013.01); *G06F 2212/7203* (2013.01)

(58) Field of Classification Search
None
See application file for complete search history.

(56) References Cited

U.S. PATENT DOCUMENTS

| 2006/0004976 A1 | 1/2006 | Rader |
| 2010/0088463 A1* | 4/2010 | Im .................. G06F 12/0246 711/103 |
| 2013/0117497 A1* | 5/2013 | Cui .................. G06F 12/121 711/103 |
| 2014/0115241 A1* | 4/2014 | Wei .................. G06F 12/0246 711/103 |

FOREIGN PATENT DOCUMENTS

| KR | 1020040040458 | 5/2004 |
| KR | 1020070080307 | 8/2007 |

* cited by examiner

*Primary Examiner* — Idriss N Alrobaye
*Assistant Examiner* — Dayton Lewis-Taylor
(74) *Attorney, Agent, or Firm* — IP & T Group LLP

(57) ABSTRACT

A semiconductor device includes a buffer memory, a plurality of function blocks, each of which transmits to a request of access to the buffer memory, and accesses the buffer memory according to a response to the request of access; and a buffer management unit suitable for receiving the request of access, and transmitting the response to the request of access according to a status of the buffer memory, wherein the buffer management unit and each of the plurality of function blocks may communicate through a dedicated channel.

18 Claims, 15 Drawing Sheets

SEMICONDUCTOR DEVICE INCLUDING A PLURALITY OF FUNCTION BLOCKS

CROSS-REFERENCE TO RELATED APPLICATION

The present application claims priority to Korean patent application number 10-2014-0044925, filed on Apr. 15, 2014, the entire disclosure of which is incorporated herein in its entirety by reference.

BACKGROUND

Field of Invention

Various exemplary embodiments of the present invention relate generally to an electronic device, and more particularly, to a semiconductor device including a plurality of function blocks.

Description of Related Art

A semiconductor device may include a plurality of function blocks. These function blocks may be coupled to a system bus, and communicate with each other.

The semiconductor device may include a main memory. The plurality of function blocks may access the main memory under the control of a central processing unit. In other words, the plurality of function blocks may write data to the main memory, and read data from the main memory.

Direct memory access has been introduced to reduce load of the central processing unit during data transfer. A direct memory access unit may transfer data between the main memory and the plurality of function blocks through a system bus. Because of the direct memory access, the load of the central processing unit is reduced to a light level such as setting up data transfer and arranging completion of data transfer.

The direct memory access units may be provided to the plurality of function blocks. Each of the direct memory access units may separately access the main memory. However, when the direct memory access units simultaneously access the main memory, a kind of arbitration means for the simultaneous access of the multiple direct memory access units is required.

SUMMARY

Exemplary embodiments of the present invention are directed to improving operation speed of a semiconductor device by allowing a plurality of function blocks in the semiconductor device to efficiently access a buffer memory.

A semiconductor device according to an embodiment of the present invention may include a buffer memory, a plurality of function blocks, each of which transmits a request of access to the buffer memory, and accesses the buffer memory according to a response to the request of access; and a buffer management unit suitable for receiving the request of access, and transmitting the response to the request of access according to a status of the buffer memory, wherein the buffer management unit and each of the plurality of function blocks may communicate through a dedicated channel.

The semiconductor device may further include a central processing unit suitable for controlling the buffer management unit and the plurality of function blocks.

A first one of the plurality of function blocks may transmit the request of access for a write operation to the buffer memory through the dedicated channel, and the first function block may access the buffer memory for the write operation through a data bus.

A second one of the plurality of function blocks may transmit the request of access for a read operation to the buffer memory through the dedicated channel, and the second function block may access the buffer memory for the read operation through the data bus.

The first function block may be a host interface suitable for writing data from a host into the buffer memory, and the second function block may be a memory interface suitable for reading data from the buffer memory in order to store the read data into a nonvolatile memory device.

The first function block may be a memory interface suitable for writing data from a nonvolatile memory device into the buffer memory, and the second function block may be a host interface suitable for reading data from the buffer memory in order to output the read data to a host.

A first one of the plurality of function blocks may transmit the request of access for a read operation to a first storage area of the buffer memory through the dedicated channel, and the first function block may access the first storage area for the read operation through a data bus.

The first function block may transmit the request of access for a write operation to a second storage area of the buffer memory through the dedicated channel, and the first function block may access the second storage area for the write operation through the data bus.

The buffer memory may include a plurality of storage areas, and the buffer management unit may include a buffer management table representing a status of each of the plurality of storage areas.

The request of access may include a request for a write operation to one or more of the plurality of storage areas, and write indexes of the one or more of the plurality of storage areas, and the buffer management unit may confirm validity of data stored in the storage areas corresponding to the write indexes by consulting the statuses of the buffer management table corresponding to the write indexes, and transmit a grant signal as the response according to the validity of data.

The buffer management unit may transmit the grant signal when the data stored in the storage areas corresponding to the write indexes is invalid.

The function block, which receives the grant signal, may transmit a write update command and the write indexes to the buffer management unit after completion of the write operation to the one or more of the plurality of storage areas corresponding to the write indexes, and the buffer management unit may change the statuses of the buffer management table corresponding to the write indexes in response to the write update command.

The request of access may include a request for a read operation to one or more of the plurality of storage areas, and read indexes of the one or more of the plurality of storage areas, and the buffer management unit may confirm validity of data stored in the storage areas corresponding to the read indexes by consulting the statuses of the buffer management table corresponding to the read indexes, and transmit a grant signal as the response according to the validity of data.

The buffer management unit may transmit the grant signal when the data stored in the storage areas corresponding to the read indexes is valid.

The function block, which receives the grant signal, may transmit a read update command and the read indexes to the buffer management unit after completion of the read operation to the one or more of the plurality of storage areas corresponding to the read indexes, and the buffer management unit may change the statuses of the buffer management table corresponding to the read indexes in response to the read update command.

The plurality of function blocks may include a host interface suitable for communicating with a host, and a memory interface suitable for communicating with a nonvolatile memory device, and the buffer memory may include a write buffer memory and a read buffer memory.

The host interface may transmit the request of access for a write operation to the write buffer memory, and the host interface may write data from the host into the write buffer memory.

The memory interface may transmit the request of access for a read operation to the write buffer memory, and the memory interface may read data from the write memory buffer in order to store the read data into the nonvolatile memory device.

The memory interface may transmit the request of access for a write operation to the read buffer memory, and the memory interface may write data from the nonvolatile memory device into the buffer memory.

The host interface may transmit the request of access for a read operation to the read buffer memory, and the host interface may read data from the buffer memory in order to output the read data to the host.

DETAILED DESCRIPTION

Hereinafter, various embodiments of the present invention will be described more fully with reference to the accompanying drawings. Only portions necessary to understand operations according to the present invention are described, and other portions will not be described in detail to avoid obscuring the present invention. The invention may, however, be embodied in many different forms and should not be construed as being limited to the embodiments set forth herein; rather, these embodiments are provided so that this disclosure will be thorough and complete, and will fully convey the concept of the invention to those skilled in the art. Various embodiments of the present invention will be described with reference to the accompanying drawings to fully explain the present invention in such a manner that it may easily be carried out by a person with ordinary skill in the art to which the present invention pertains.

Figure 1:
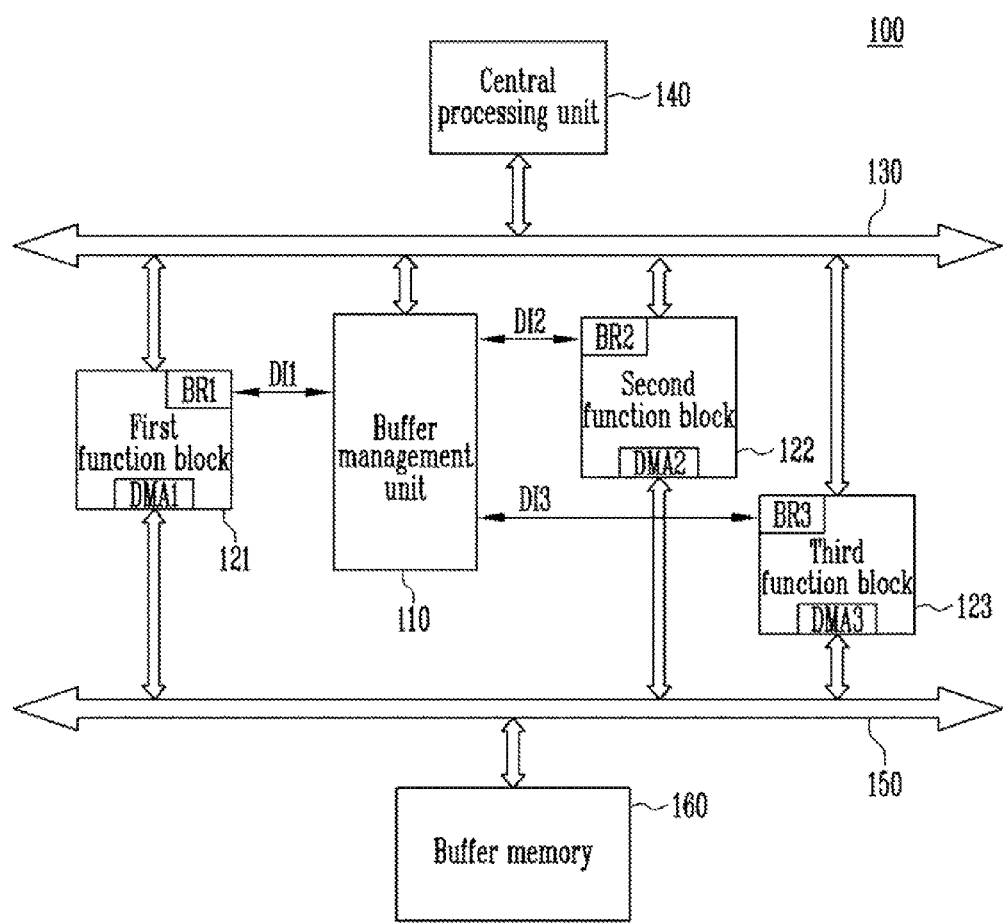
FIG. 1 is a block diagram illustrating a semiconductor device according to an embodiment of the present invention.

FIG. 1 is a block diagram illustrating a semiconductor device 100 according to an embodiment of the present invention.

Referring to FIG. 1, the semiconductor device 100 may include a buffer management unit 110, a plurality of function blocks 121 to 123, a control bus 130, a central processing unit 140, a data bus 150 and a buffer memory 160.

The buffer management unit 110 may be coupled to the central processing unit 140 through the control bus 130. The buffer management unit 110 may be controlled by the central processing unit 140. The buffer management unit 110 may be coupled to the first, second and third function blocks 121, 122 and 123 through first, second and third direct interface channels DI1, DI2 and DI3, respectively.

The buffer management unit 110 may manage storage space of the buffer memory 160. The buffer management unit 110 may keep status values indicating validity of data stored in the buffer memory 160. Based on these status values, the buffer management unit 110 may allow the respective function blocks to access the buffer memory 160. A detailed description thereof will be given below with reference to FIG. 2.

The first to third function blocks 121 to 123 may be coupled to the central processing unit 140 through the control bus 130. Each of the first to third function blocks 121 to 123 may be controlled by the central processing unit 140 through the control bus 130.

The first to third function blocks 121 to 123 may be coupled to the buffer memory 160 through the data bus 150. The first, second and third function blocks 121 to 123 may include first to third direct memory access (DMA) units DMA1, DMA2 and to DMA3, respectively. The function blocks may access the buffer memory 160 by using the direct memory access units, respectively. Each of the direct memory access units DMA1, DMA2 and to DMA3 may write data to the buffer memory 160 through the data bus 150, and read data from the buffer memory 160 through the data bus 150.

The first, second and third function blocks 121, 122 and 123 may be coupled to the buffer management unit 110 through the first, second and third direct interface channels DI1, DI2 and DI3, respectively. The first, second and third function blocks 121, 122 and 123 may include first, second and third buffer requesters BR1, BR2 and BR3, respectively. Each of the buffer requesters BR1, BR2 and BR3 may transmit to the buffer management unit 110 through a corresponding one of the direct interface channels DI1, DI2 and DI3 a request of access to the buffer memory 160. Each of the function blocks 121, 122 and 123 may access the buffer memory 160 through the data bus 150 according to a response to the request of access transmitted from the buffer management unit 110.

The control bus 130 may couple the central processing unit 140 to the buffer management unit 110, and the first to third function blocks 121 to 123. For example, the control bus 130 may adopt the advanced high performance bus architecture (AHBA).

The central processing unit 140 may control general operations of the semiconductor device 100. The central processing unit 140 may control the buffer management unit 110, and the first to third function blocks 121 to 123 through the control bus 130.

According to an exemplary embodiment, the central processing unit 140 may periodically check the status values stored in the buffer management unit 110 through the control bus 130, and inform the respective function blocks 121, 122 and 123 of access-available storage areas in the buffer memory 16 based on the status values. For example, the central processing unit 140 may inform the first function block 121 of a first storage area corresponding to the status value indicating that data stored in the first storage area is invalid. The first function block 121 may write data to the first storage area according to a request of access to the first storage area, and a positive response to the request of access to the first storage area, which are exchanged between the first function block 121 and the buffer management unit 110. For example, the central processing unit 140 may inform the second function block 122 or the third function block 123 of a second storage area corresponding to the status value indicating that data stored in the second storage area is valid. The second function block 122 or the third function block 123 may read data from the second storage area according to a request of access to the second storage area, and a positive response to the request of access to the second storage area, which are exchanged between the second or third function block 122 or 123 and the buffer management unit 110.

According to an embodiment, the central processing unit 140 may be coupled to a separate memory (not illustrated) storing firmware, and operated by the firmware from the memory.

For illustrative purposes, FIG. 1 shows the single central processing unit 140 provided in the semiconductor device 100. However, two or more central processing units performing different functions may be provided in the semiconductor device 100. When two or more central processing units are provided, operation speed of the semiconductor device 100 may be markedly improved.

The data bus 150 may couple the first to third function blocks 121 to 123 to the buffer memory 160. The first to third function blocks 121 to 123 may write data to the buffer memory 160 through the data bus 150, and read data from the buffer memory 160 through the data bus 150. According to an embodiment, the data bus 150 may support the Advanced eXtensible Interface (AXI) protocol.

The buffer memory 160 may be coupled to the data bus 150. The buffer memory 160 may be a nonvolatile memory. For example, the buffer memory 160 may be one or more, or a combination of the Static RAM (SRAM), Dynamic RAM (DRAM), and Synchronous DRAM (SDRAM).

According to an embodiment of the present invention, separate direct interface channels DI1, DI2 and DI3 may be provided for the request of access to the buffer memory 160, and the response to the request of access between the buffer management unit 110, and each of the first to third function blocks 121 to 123. Each of the function blocks 121, 122 and 123 may transmit the request of access to the buffer memory 160 to the buffer management unit 110 through a corresponding one of the direct interface channels DI1, DI2 and DI3. Each of the first to third function blocks 121 to 123 may access the buffer memory 160 through the data bus 150 according to the response to the request of access transmitted from the buffer management unit 110 through the corresponding one of the direct interface channels DI1, DI2 and DI3. In other words, in order for the request of access and the corresponding response between the buffer management unit 110 and each of the first to third function blocks 121 to 123 as described above, each of the function blocks 121, 122 and 123 may use the corresponding one of the direct interface channels DI1, DI2 and DI3 without using the data bus 150 or the control bus 130. Therefore, the time required to access the buffer memory 160 may be reduced. In addition, load to the data bus 150 or the control bus 130 may be reduced.

Accordingly, operation speed of the semiconductor device 100 may be improved.

Figure 2:
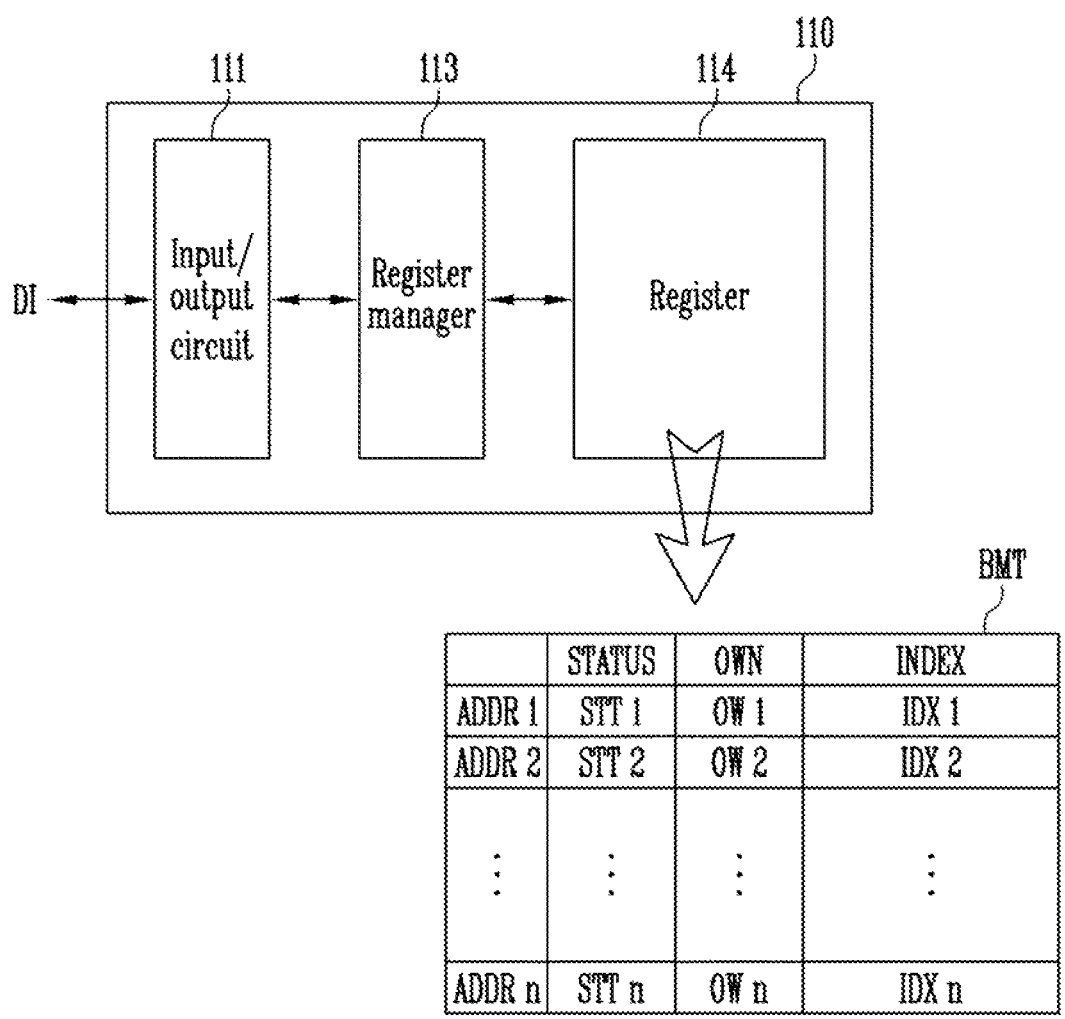
FIG. 2 is a block diagram illustrating a buffer management unit shown in FIG. 1.

FIG. 2 is a block diagram illustrating the buffer management unit 110 shown in FIG. 1.

Referring to FIGS. 1 and 2, the buffer management unit 110 may include an input/output circuit 111, a register manager 113, and a register 114. The input/output circuit 111 may be coupled to the corresponding one of the function blocks 121, 122 and 123 through the direct interface channel DI. The direct interface channel DI may indicate the corresponding one of the first to third direct interface channels DI1 to DI3 described above with reference to FIG. 1. The other direct interface channels may be removed for a clearer explanation.

The input/output circuit 111 may receive the request of access to the buffer memory 160 from the corresponding one of the function blocks 121 to 123 through the direct interface channel DI, and transfer the request of access to the buffer memory 160 to the register manager 113. The input/output circuit 111 may receive a grant signal from the register manager 113, and transfer the received grant signal to the corresponding one of the function blocks 121 to 123 through the direct interface channel DI.

The register manager 113 may be coupled to the input/output circuit 111, and the register 114. The register manager 113 may manage the register 114.

The register 114 may store a buffer management table BMT. The buffer management table BMT may include an index field INDEX, an ownership field OWN, and a status field STATUS. First to n-th address ADDR1 to ADDRn may indicate the plurality of storage areas in the buffer memory 160, respectively.

The index field INDEX may include first to n-th indexes IDX1 to IDXn. These indexes may be provided to efficiently use the limited capacity of the buffer memory 160 by circularly managing the storage areas of the buffer memory 160. The first to n-th indexes IDX1 to IDXn may correspond to the first to n-th addresses ADDR1 to ADDRn, respectively. Therefore, the first to n-th indexes IDX1 to IDXn may correspond to the storage areas in the buffer memory 160, respectively.

The ownership field OWN may include first to n-th ownership values OW1 to Own corresponding to the first to n-th indexes IDX1 to IDXn, respectively. Each of the ownership values may indicate one of the function blocks 121, 122 and 123 accessing the storage area in the buffer memory 160 represented by the corresponding one of the indexes IDX1 to IDXn. For example, the ownership value may be '00' when the corresponding storage area is not accessed, the ownership value may be '01' when the corresponding storage area is accessed by the first function block 121, the ownership value may be '10' when the corresponding storage area is accessed by the second function block 122, and the ownership value may be '11' when the corresponding storage area is accessed by the third function block 123.

The status field STATUS may include first to n-th status values STT1 to STTn corresponding to the first to n-th indexes IDX1 to IDXn, respectively. Each of the status values may indicate the validity of data stored in the corresponding storage area in the buffer memory 160. For example, when the data stored in the corresponding storage area is valid, the status value may be '1,' and when the data stored in the corresponding storage area is invalid, the status value may be '0.'

The register manager 113 may manage the indexes IDX1 to IDXn, the ownership values OW1 to Own, and the status values STT1 to STTn by communicating with the first to third function blocks 121 to 123.

The request of access to the buffer memory 160 may include one or more of the indexes IDX1 to IDXn. The register manager 113 may refer to one of the status values STT1 to STTn corresponding to the index included in the request of access, and generate a grant signal according to the status value corresponding to the index included in the request of access. The grant signal may be transmitted to the corresponding one of the function blocks 121 to 123 through the input/output circuit 111, and the direct interface channel DI. In response to the grant signal, one of the function blocks 121 to 123, which has transmitted the request of access, and receives the grant signal, may access the storage area in the buffer memory 160 corresponding to the index included in the request of access.

Figure 3:
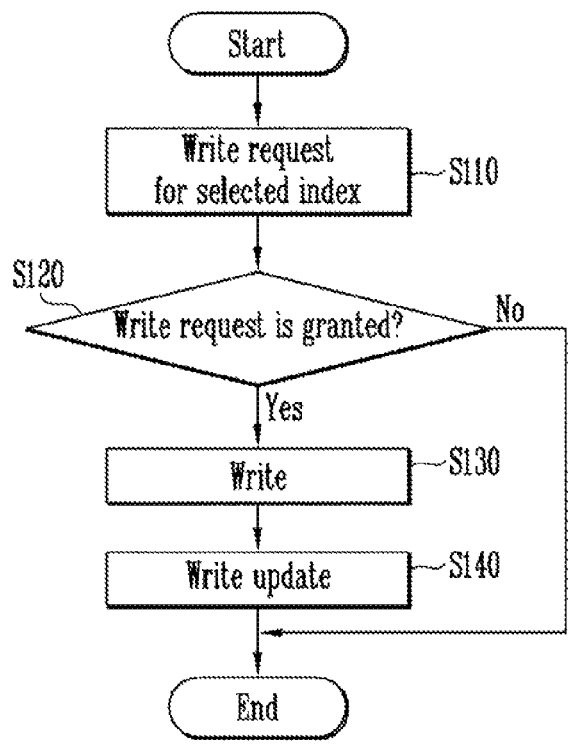
FIG. 3 is a flowchart illustrating a method for each function block to write data to a buffer memory.

FIG. 3 is a flowchart illustrating a method for each function block to write data to the buffer memory 160. For clearer explanation, it is assumed that the first function block 121 writes data to the buffer memory 160.

With reference to FIGS. 1 to 3, at step S110, the first function block 121 may transmit a write request and a write index (e.g., IDX2) as the request of access to the buffer memory 160.

The register manager 113 may consult the status value (e.g., STT2) corresponding to the write index among the indexes IDX1 to IDXn in the buffer management table BMT to confirm the validity of data stored in the storage area of the buffer memory 160 indicated by the write index included in the request of access in response to the write request. When the corresponding status value indicates invalid data, the register manager 113 may transmit an enabled grant signal to the first function block 121 through the first direct interface channel DI1. In other words, the register manager 113 may transmit the enabled grant signal when the storage area corresponding to the write index in the buffer memory 160 is write-available. The register manager 113 may transmit a disabled grant signal to the first function block 121 when the corresponding status value indicates valid data. In other words, the register manager 113 may transmit the disabled grant signal when valid data is stored in the storage area in the buffer memory 160 corresponding to the write index.

According to the enabled grant signal, the first function block 121 may occupy the storage area corresponding to the write index in the buffer memory 160. The register manager 113 may change the ownership value (e.g., OW2) corresponding to the write index to '01' indicating occupancy of the storage area corresponding to the write index by the first function block 121.

At step S120, the first function block 121 may perform step S130 when the write request is granted. For example, when the grant signal is enabled, step S130 may be performed. When the write request is not granted, the first function block 121 may transmit the request of access including another write index.

At step S130, the first function block 121 may write data to the storage area in the buffer memory 160 corresponding to the write index. According to an embodiment, the first function block 121 may generate the address (e.g., ADDR2) corresponding to the write index (e.g., IDX2), and write data to the storage area indicated by the generated address.

At step S140, after completion of the write operation to the storage area of the buffer memory 160 indicated by the generated address, a write update may be performed. The first function block 121 may transmit the write update command and the update index to the buffer management unit 110. The buffer management unit 110 may change the status value corresponding to the update index among the indexes IDX1 to IDXn to indicate valid data in response to the write update command. When the status value indicates valid data, it may mean that valid data is stored in the storage area in the buffer memory 160 corresponding to the update index.

Transmission of the write update command and the update index may mean that the first function block 121 releases occupation of the storage area corresponding to the write index, or the update index in the buffer memory 160. The register manager 113 may change the ownership value corresponding to the write index to '00' indicating that none of the first to third function blocks 121 to 123 occupies the storage area corresponding to the update index.

Figure 4:
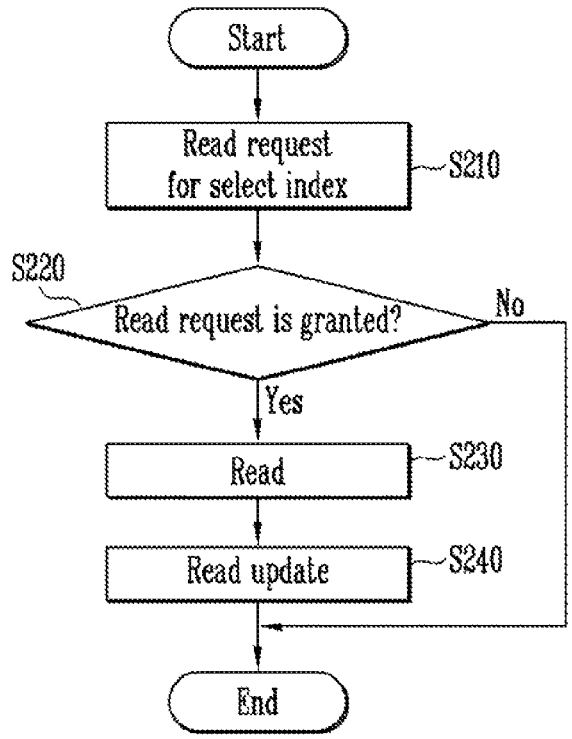
FIG. 4 is a flowchart illustrating a method for each function block to read data from the buffer memory.

FIG. 4 is a flowchart illustrating a method for each function block to read data from the buffer memory 160. For a clearer explanation, it is described as an example that the second function block 122 reads data from the buffer memory 160.

Referring to FIGS. 1, 2 and 4, at step S210, the second function block 122 may transmit a read request and a read index (e.g., IDX2) as the request of access to the buffer memory 160.

The register manager 113 may consult the status value (e.g., STT2) corresponding to the read index among the indexes IDX1 to IDXn in the buffer management table BMT to confirm the validity of data stored in the storage area of the buffer memory 160 indicated by the read index included in the request of access in response to the read request. The register manager 113 may transmit the enabled grant signal to the second function block 122 through the second direct interface channel DI2 when the corresponding status value indicates valid data. In other words, the register manager 113 may grant the read request when valid data is stored in the storage area of the buffer memory 160 indicated by the read index included in the request of access. The register manager 113 may transmit the disabled grant signal to the second function block 122 through the second direct interface channel DI2 when the corresponding status value indicates invalid data. In other words, the register manager 113 may transmit the disabled grant signal when no valid data to be read is stored in the storage area in the buffer memory 160 corresponding to the read index.

According to the enabled grant signal, the register manager 113 may change the ownership value (e.g., OW2) corresponding to the read index to '10' indicating occupation of the storage area corresponding to the read index by the second function block 122.

At step S220, the second function block 122 may perform step S230 when the read request is granted. For example, the second function block 122 may perform step S230 when the grant signal is enabled. When the read request is not granted, the second function block 122 may transmit the request of access including another read index.

At step S230, the second function block 122 may read data from the storage area in the buffer memory 160 corresponding to the read index. According to an embodiment, the second function block 122 may generate the address (e.g., ADDR2) corresponding to the read index (e.g., IDX2), and read data from the storage area in the buffer memory 160 indicated by the generated address.

At step S240, after completion of the read operation to the storage area of the buffer memory 160 indicated by the generated address, a read update may be performed. The second function block 122 may transmit the read update command and the update index to the buffer management unit 110. The buffer management unit 110 may change the status value corresponding to the update index among the indexes IDX1 to IDXn to indicate invalid data in response to the read update command. When the status value is changed to indicate invalid data, it may mean that no valid data is stored in the storage area in the buffer memory 160 corresponding to the update index.

In another example, the buffer management unit 110 may maintain the status value corresponding to the update index as valid. When the status value is maintained as valid, it may mean that data in the storage area in the buffer memory 160 corresponding to the update index is valid. In this example, the buffer management unit 110 may change only the ownership value corresponding to the read index to '00' indicating that none of the first to third function blocks 121 to 123 occupies the storage area corresponding to the update index.

FIGS. 5 to 9 are schematic views illustrating write and read processes of the buffer memory 160. With reference to FIGS. 5 to 9, for a clearer description, it is described as an example that data is written to the storage areas in the buffer memory 160 corresponding to the first and second indexes IDX1 and IDX2, and the written data is read.

Figure 5:
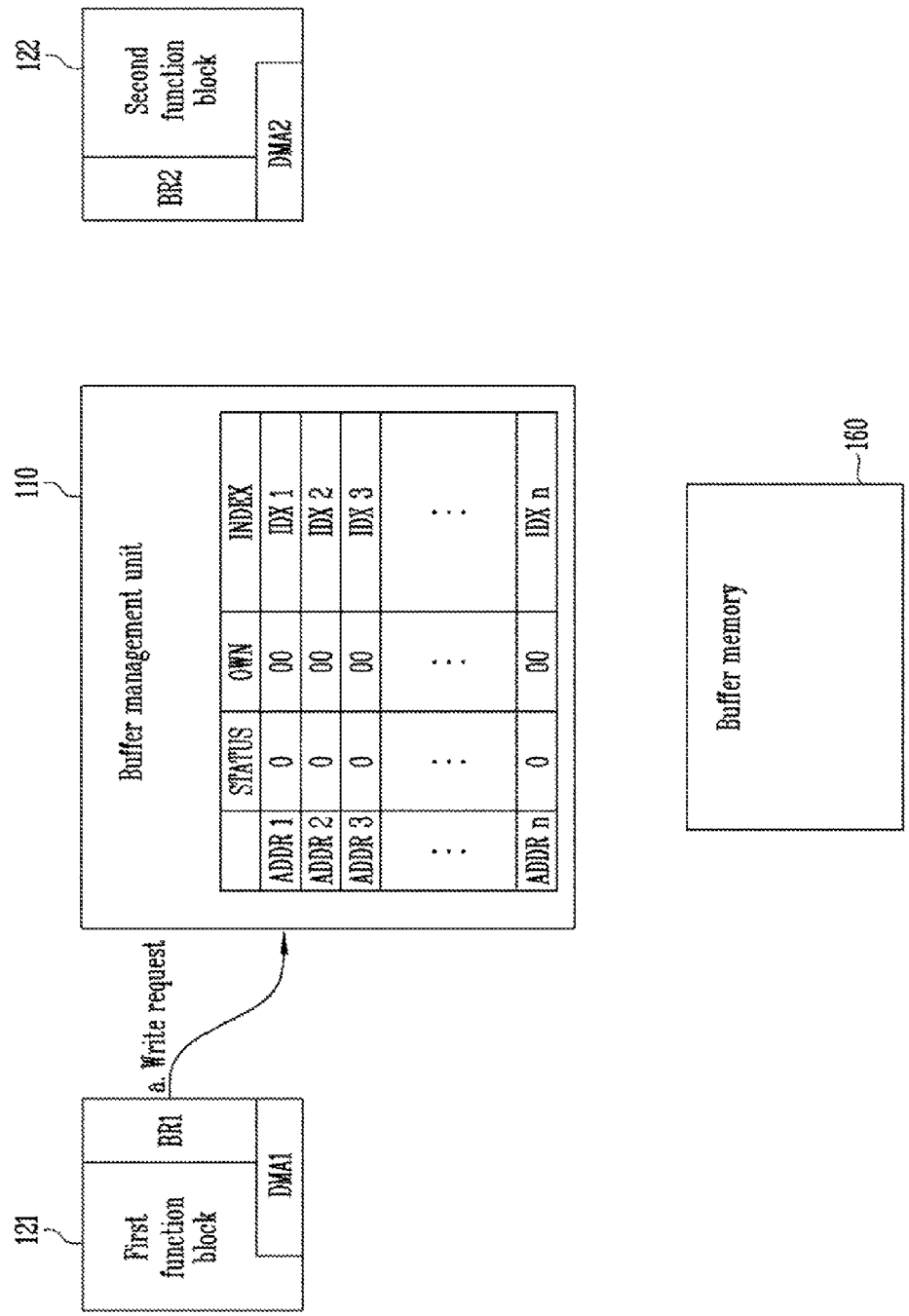
FIGS. 5 to 9 are schematic views illustrating write and read processes of a buffer memory.

First, referring to FIG. 5, the first buffer requester BR1 of the first function block 121 may transmit to the buffer management unit 110 the request of access to the buffer memory 160 (a). The request of access may include the write request and the write index. When two requests of access are transmitted, two write indexes will be provided in the requests of access.

The buffer management unit 110 may consult the status values (STT1 and STT2) corresponding to the write indexes IDX1 and IDX2 among the indexes IDX1 to IDXn in the buffer management table BMT to confirm the validity of data stored in the storage area of the buffer memory 160 indicated by the write indexes IDX1 and IDX2 included in the request of access. As described above with reference to FIG. 2, when the data stored in the corresponding storage area is valid, the status value may be '1,' and when the data stored in the corresponding storage area is invalid, the status value may be '0.'

According to an example, the buffer management unit 110 may additionally refer to the ownership values OW1 and OW2 in the buffer management table BMT corresponding to the write indexes IDX1 and IDX2, respectively. For example, the ownership value for the storage areas indicated by the write indexes IDX1 and IDX2 may be one of four occupancy values '00' to '11' indicating occupancy by none, and the first to third function blocks 121 to 123, respectively, as described above with reference to FIG. 2.

Figure 6:
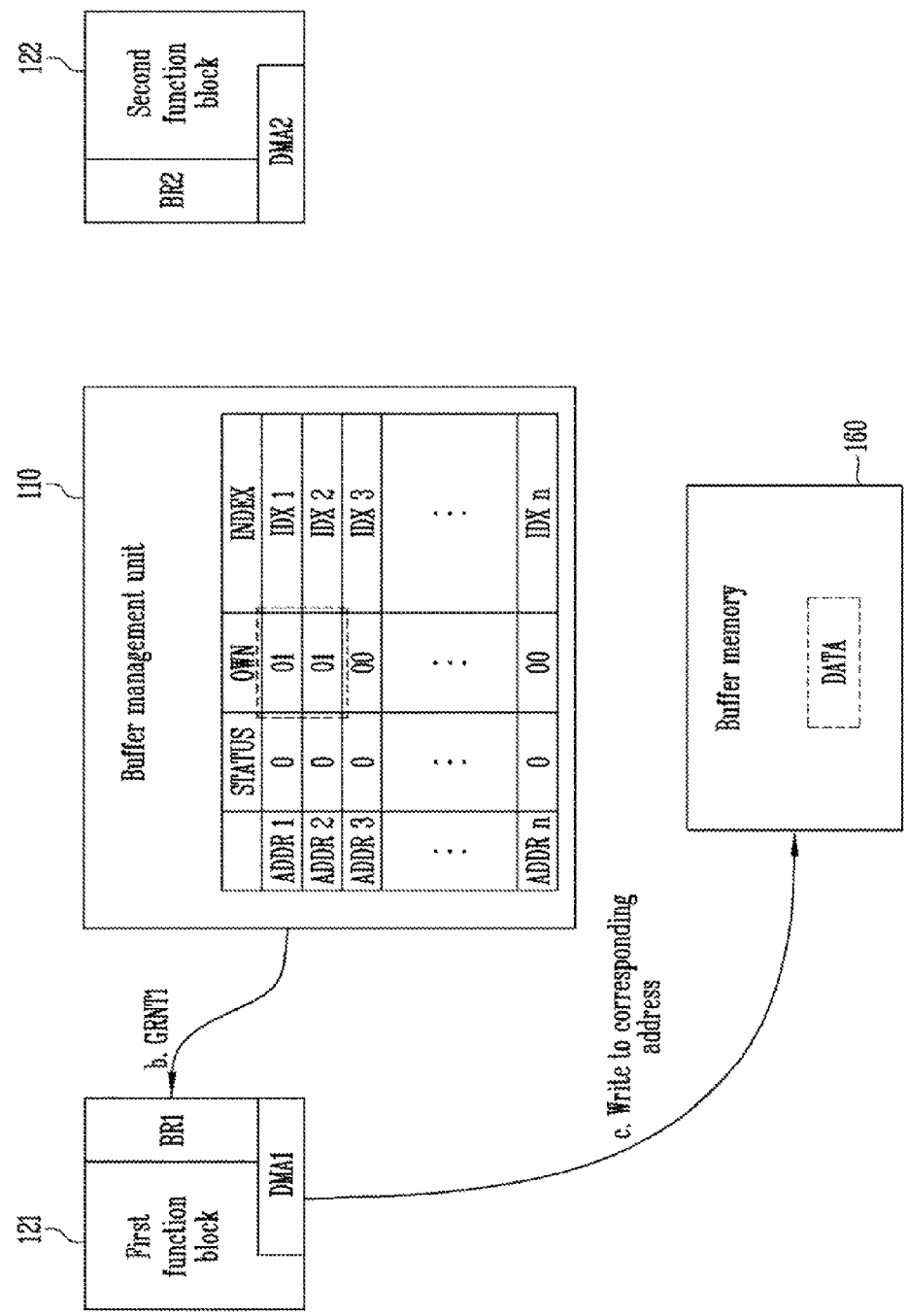

Referring to FIG. 6, when the status values STT1 and STT2 corresponding to the write indexes IDX1 and IDX2 are '0' and the ownership values OW1 and OW2 are '00,' the buffer management unit 110 may transmit a grant signal GRNT1 to the first function block 121 (b) according to the confirmation.

The first and second indexes IDX1 and IDX are occupied by the first function block 121 according to the grant signal GRNT1. The buffer management unit 110 may change the ownership values OW1 and OW2 to '01.' When the ownership values OW1 and OW2 are '01,' the first and third function blocks 122 and 123 may fail to access the storage area corresponding to the first and second indexes IDX1 and IDX2 in the buffer memory 160.

And then, the first function block 121 may generate the addresses ADDR1 and ADDR2 corresponding to the write indexes IDX1 and IDX2, respectively, and write data DATA to the storage areas of the buffer memory 160 indicated by the addresses ADDR1 and ADDR2 (c).

Figure 7:
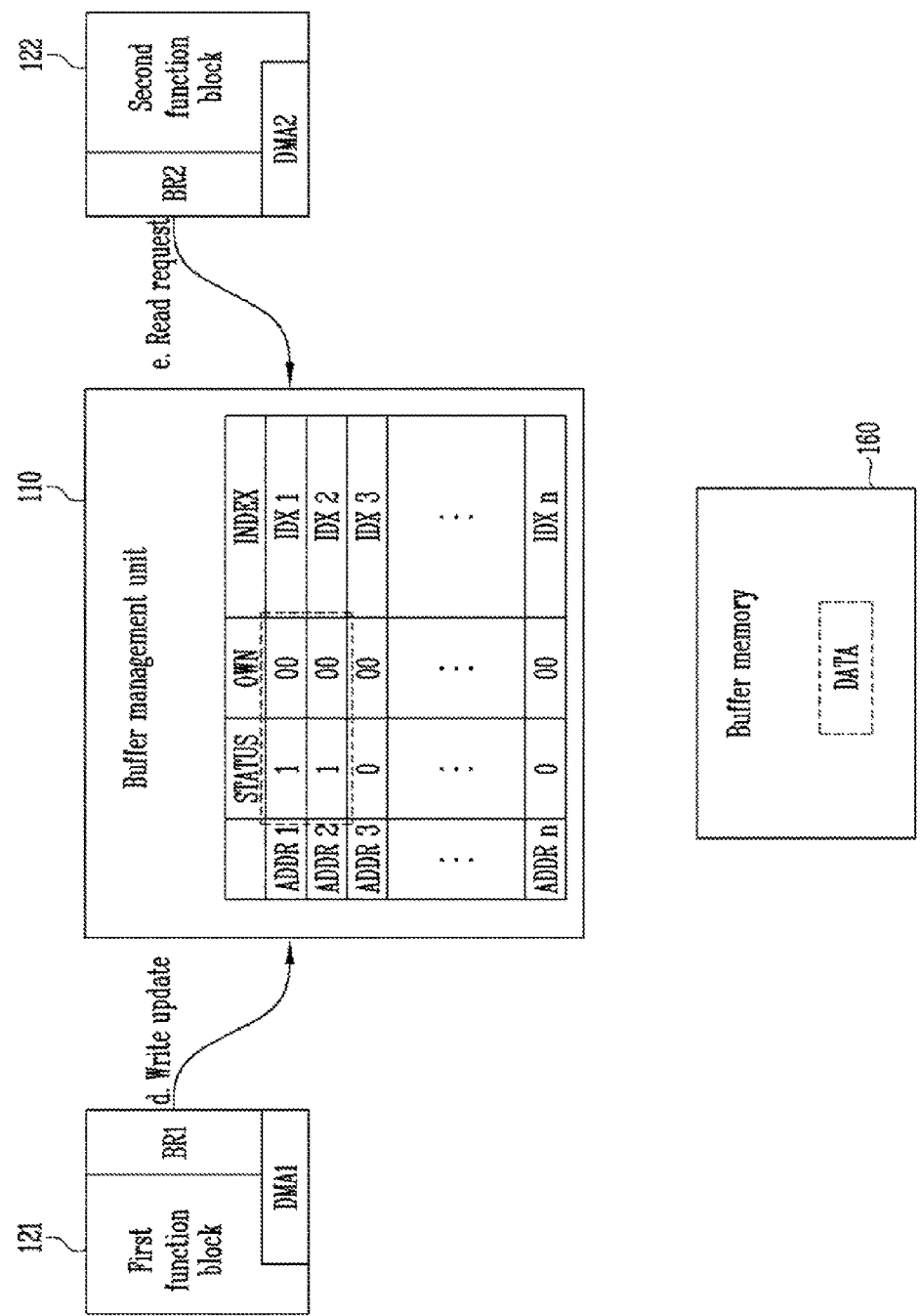

With reference to FIG. 7, after the data DATA is written to the storage areas of the buffer memory 160 indicated by the addresses ADDR1 and ADDR2, the first function block 121 may perform the write update by transmitting a write update command and an update index to the buffer management unit 110 (d). The first and second indexes IDX1 and IDX2 may be transmitted as the update index.

The buffer management unit 110 may change the status values STT1 and STT2 corresponding to the update indexes IDX1 and IDX2, respectively, in response to the write update command. In other words, the buffer management table BMT may indicate that valid data is stored in the storage areas corresponding to the first and second indexes IDX1 and IDX2 in the buffer memory 160. In addition, the buffer management unit 110 may return the ownership values OW1 and OW2 corresponding to the update indexes DX1 and IDX2 to '00.'

Subsequently, the second function block 122 may transmit to the buffer management unit 110 the request of access to the buffer memory 160 (e) for a data read operation under the control of the central processing unit 140 described above with reference to FIG. 1. The second function block 122 may transmit the request of access including the read request and the read indexes IDX1 and IDX2 to the buffer management unit 110.

Figure 8:
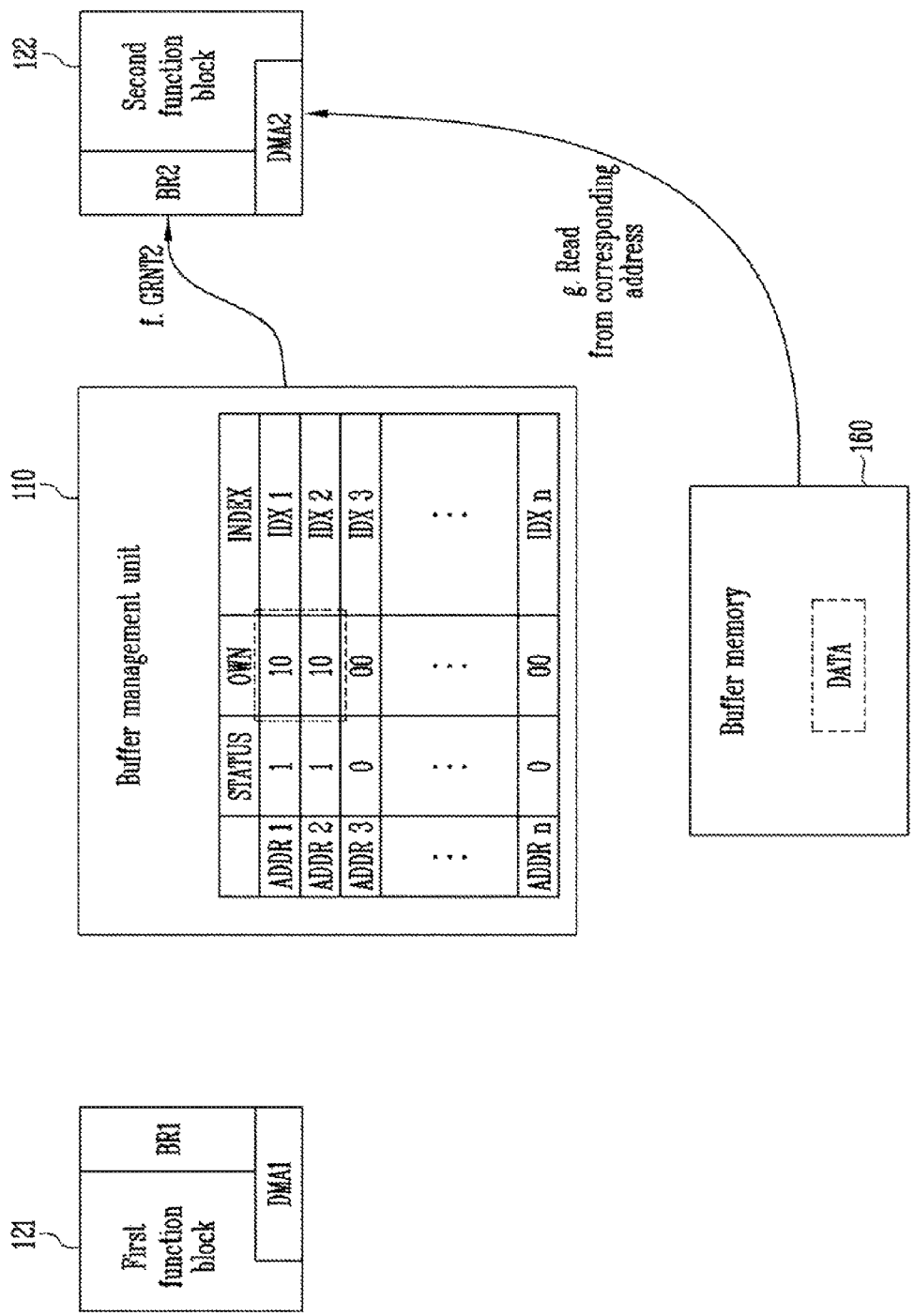

The current status values STT1 and STT2 corresponding to the read indexes IDX1 and IDX2 may be '1' due to the previous write operation to the buffer memory 160, and the ownership values OW1 and OW2 corresponding to the read indexes IDX1 and IDX2 may be '00' due to the previous write update operation. As illustrated in FIG. 8, the buffer management unit 110 may consult the status value corresponding to the read indexes IDX1 and IDX2 in the buffer management table BMT to confirm the validity of data stored in the storage area of the buffer memory 160 indicated by the read indexes IDX1 and IDX2 included in the request of access, and transmit a grant signal GRNT2 to the second function block 122 (f) according to the confirmation. In addition, the buffer management unit 110 may change the ownership values OW1 and OW2 to '01' corresponding to the second function block 122.

Subsequently, the second function block 122 may generate the addresses ADDR1 and ADDR2 corresponding to the read indexes IDX1 and IDX2, respectively, and read data from the storage areas indicated by the addresses ADDR1 and ADDR2 in the buffer memory 160 (g).

Figure 9:
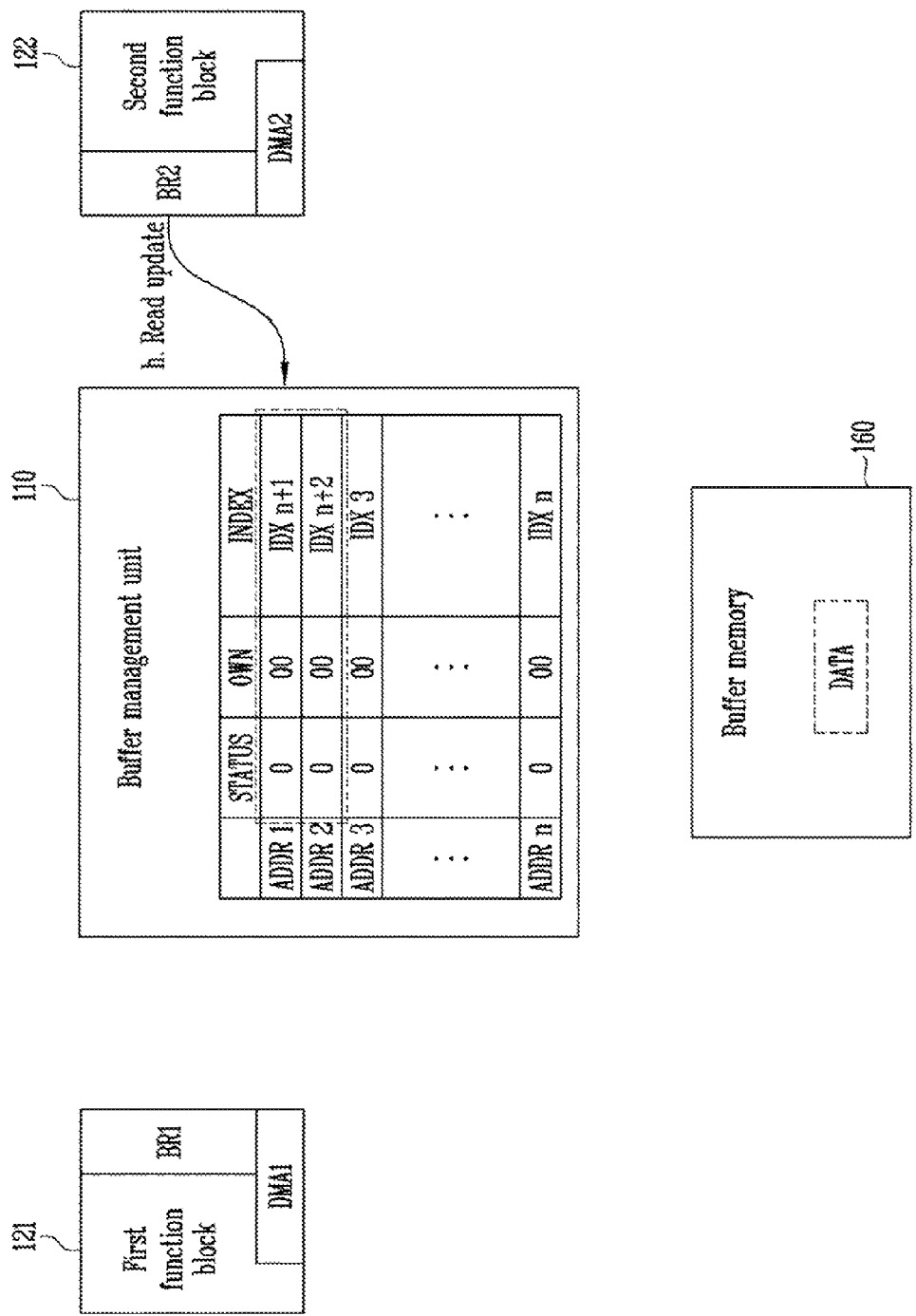

Subsequently, referring to FIG. 9, the read update may be performed after completion of the read operation to the storage areas of the buffer memory 160 indicated by the addresses ADDR1 and ADDR2. The second function block 122 may transmit the read update command and the update indexes IDX1 and IDX2 to the buffer management unit 110 (h).

The buffer management unit 110 may change the update indexes IDX1 and IDX2 to indexes IDXn+1 and IDXn+2 of the next loop, which is for efficient use of the limited capacity of the buffer memory 160 by circularly managing the storage areas of the buffer memory 160, in response to the read update command. The indexes IDXn+1 and IDXn+2 may correspond to the first and second addresses ADDR1 and ADDR2. In addition, the buffer management unit 110 may set status values corresponding to n-th+1 and n-th+2 indexes IDXn+1 and IDXn+2 to '1,' which means that invalid data is stored in the storage areas corresponding to the n-th+1 and n-th+2 indexes IDXn+1 and IDXn+2 in the buffer memory 160. In addition, the buffer management unit 110 may return the ownership values corresponding to the n-th+1 and n-th+2 indexes IDXn+1 and IDXn+2 to '00.'

Figure 10:
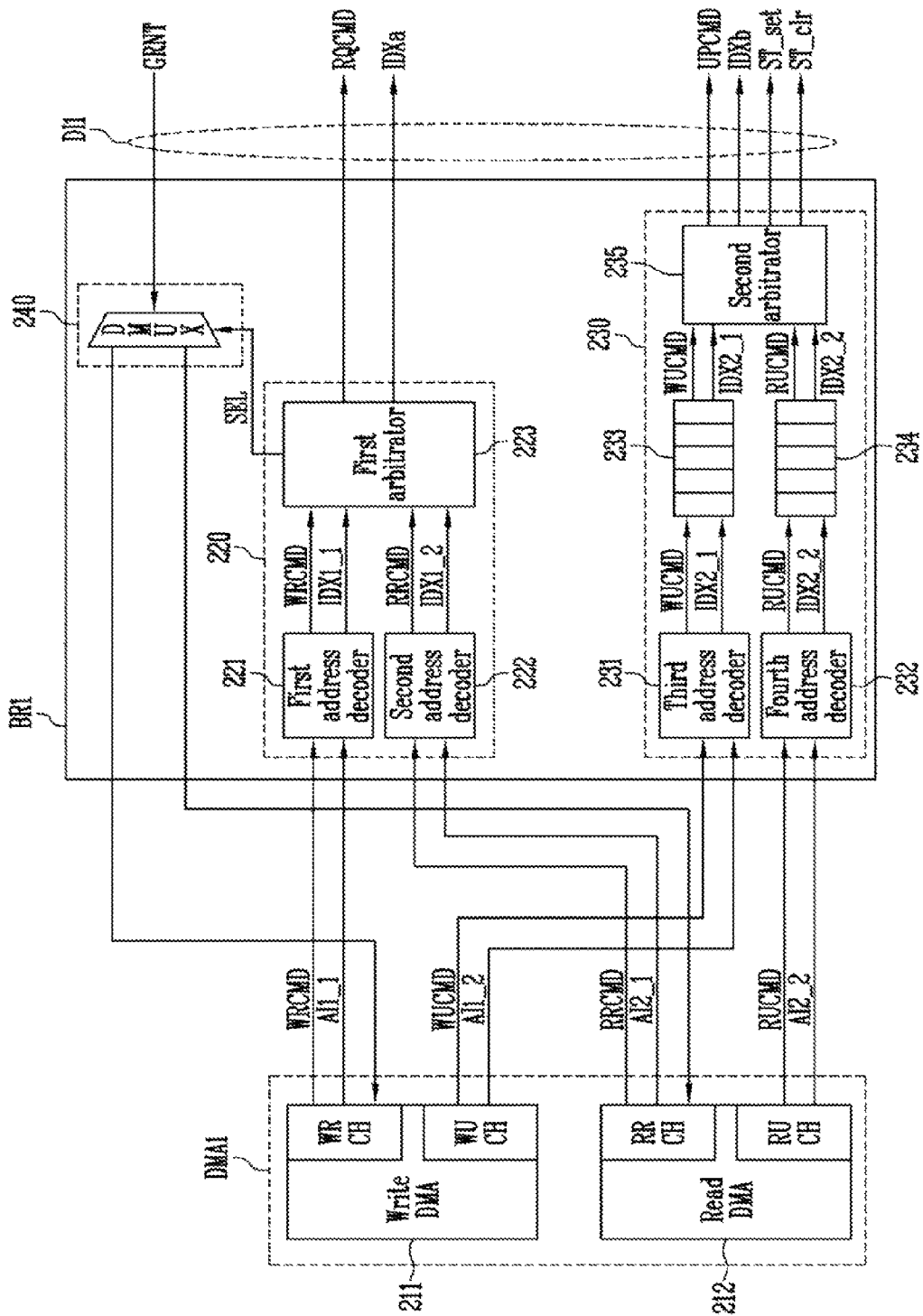
FIG. 10 is a block diagram illustrating a direct memory access unit, and a buffer requester included in each of one of the first to third function blocks.

FIG. 10 is a block diagram illustrating the direct memory access unit DMA1, and the buffer requester BR1 included in each of the first to third function blocks 121 to 123. FIG. 10 shows the direct memory access unit DMA1, and the buffer requester BR11 included in the first function block 121 as an example.

Referring to FIGS. 1, 2 and 10, the direct memory access unit DMA1 may include a write direct memory accessor 211, and a read direct memory accessor 212.

The write direct memory accessor 211 may write data to the buffer memory 160. The read direct memory accessor 212 may read data from the buffer memory 160.

The write direct memory accessor 211 may generate and transmit the write request WRCMD and write area information AI1_1 through a write request channel WRCH to a first address decoder 221 of the buffer requester BR1.

According to an embodiment, area information such as the write area information AI1_1 may include a start index and an index size. The index size may refer to the number of indexes corresponding to the storage area of the buffer memory 160 to be accessed. The storage area of the buffer memory 160 to be accessed may be identified according to the start index and the index size.

The write direct memory accessor 211 may receive the grant signal GRNT through a grant signal receiver 240 of the buffer requester BR1. In response to the grant signal GRNT, the write direct memory accessor 211 may write the data to the storage area of the buffer memory 160 identified by the start index and the index size.

The write direct memory accessor 211 may generate the write update command WUCMD and update area information AI1_2 through a write update channel WUCH after the write operation to the buffer memory 160. The generated write update command WUCMD and update area information AI1_2 may be transmitted to a third address decoder 231 of the buffer requester BR1.

The read direct memory accessor 212 may generate and transmit the read request RRCMD and read area information AI2_1 through a read request channel RRCH. The read direct memory accessor 212 may receive the grant signal GRNT through the grant signal receiver 240 of the buffer requester BR1. In response to the grant signal GRNT, the read direct memory accessor 212 may read the data from the storage area of the buffer memory 160 identified by the start index and the index size included in the read area information AI2_1.

The read direct memory accessor 212 may generate and transmit the read update command RUCMD and update area information AI2_2 to a fourth address decoder 232 of the buffer requester BR1 through a read update channel RUCH after the read operation to the buffer memory 160.

The buffer requester BR1 may include an access request transmitter 220, an update request transmitter 230, and the grant signal receiver 240.

The access request transmitter 220 may include first and second address decoders 221 and 222 and a first arbitrator 223. Each of the address decoders 221 and 222 may decode the received area information AI1_1 and AI2_1 respectively transmitted from the write direct memory accessor 211, and the read direct memory accessor 212.

The first address decoder 221 may receive the write request WRCMD and the write area information AI1_1. The first address decoder 221 may decode the write area information AI1_1 including the start index and the index size to generate the write index IDX1_1. For example, the first address decoder 221 may generate the first and second indexes IDX1 and IDX2 as the write index IDX1_1 when the start index of the write area information AI1_1 is the first write index IDX1 and the index size of the write area information AI1_1 is 2. For example, the first address decoder 221 may generate the first index IDX1 as the write index IDX1_1 when the start index is the first write index IDX1 and the index size is 1. The first address decoder 221 may transfer the write request WRCMD from the write direct memory accessor 211 to the first arbitrator 223.

The second address decoder 222 may receive the read request RRCMD and the read area information AI2_1. The second address decoder 222 may decode the read area information AI2_1 including the start index and the index size to generate a read index IDX1_2. The second address decoder 222 may transfer the read request RRCMD from the read direct memory accessor 212 to the first arbitrator 223.

The first arbitrator 223 may receive the write request WRCMD and the write index IDX1_1 from the first address decoder 221, and receive the read request RRCMD and the read index IDX1_2 from the second address decoder 222. The first arbitrator 223 may arbitrate between a pair of the write request WRCMD and the write index IDX1_1 from the first address decoder 221, and a pair of the read request RRCMD and the read index IDX1_2 from the second address decoder 222. For example, the first arbitrator 223 may output the write request WRCMD and the write index IDX1_1 as a request RQCMD and an output index IDXa, respectively, which form the request of access to the buffer memory 160 for the write operation. For example, the first arbitrator 223 may output the read request RRCMD and the read index IDX1_2 as the request RQCMD and the output index IDXa, respectively, which form the request of access to the buffer memory 160 for the read operation. The request RQCMD and the output index IDXa may be transmitted to the buffer management unit 110 through the first direct interface channel DI1.

When the first arbitrator 223 receives the information from the first address decoder 221 and the information from the second address decoder 222 at the same time, the first arbitrator 223 may sequentially output the information from the first address decoder 221, and the information from the second address decoder 222 in a predetermined order.

The update request transmitter 230 may include third and fourth address decoders 231 and 232, first and second queues 233 and 234, and a second arbitrator 235. Each of the address decoders 231 and 232 may decode the received area information AI1_2 and AI2_2 respectively transmitted from the write direct memory accessor 211, and the read direct memory accessor 212.

The third address decoder 231 may receive the write update command WUCMD and the update area information AI1_2. The third address decoder 231 may decode the update area information AI1_2 including the start index and the index size to generate an update index IDX2_1, and store the generated update index IDX2_1 and the write update command WUCMD in the first queue 233.

The fourth address decoder 232 may receive the read update command RUCMD and the update area information AI2_2. The fourth address decoder 232 may decode the update area information AI2_2 to generate an update index IDX2_2. The fourth address decoder 232 may store the generated update index IDX2_2 and the read update command RUCMD in the second queue 234.

Each of the first and second queues 233 and 234 may store and output data on a first-in-first-out basis.

The second arbitrator 235 may receive the write update command WUCMD and the update index IDX2_1 from the first queue 233, and receive the read update command RUCMD and the update index IDX2_2 from the second queue 234. The second arbitrator 235 may arbitrate between a pair of the write update command WUCMD and the update index IDX1_2 from the first queue 233, and a pair of the read update command RUCMD and the update index IDX2_2 from the second queue 234, and generate the update command UPCMD and the output index IDXb. For example, the second arbitrator 235 may output the write update command WUCMD and the update index IDX2_1 as the update command UPCMD and the output index IDXb, respectively. For example, the second arbitrator 235 may output the read update command RUCMD and the update index IDX2_2 as the update command UPCMD and the output index IDXb, respectively. The update command UPCMD and the output index IDXb may be transmitted to the buffer management unit 110 through the direct interface channel DI1.

The second arbitrator 235 may additionally generate and transmit a set signal ST_set and a clear signal ST_clr to the buffer management unit 110 through the direct interface channel DI1. According to an embodiment, the second arbitrator 235 may enable the set signal ST_set when transmitting the write update command WUCMD as the update command UPCMD. According to an embodiment, the second arbitrator 235 may enable the clear signal ST_clr when transmitting the read update command RUCMD as the update command UPCMD.

In this case of the set signal ST_set and the clear signal ST_clr, the buffer management unit 110 may set the corresponding status value on the basis of the set signal ST_set, and the clear signal ST_clr. When the set signal ST_set is enabled, it may mean that a write update is performed. The buffer management unit 110 may change the corresponding status value to '1' when the set signal ST_set is enabled. When the clear signal ST_clr is enabled, it may mean that a read update is performed. The buffer management unit 110 may change the corresponding status value to '0' when the clear signal ST_clr is enabled.

The grant signal receiver 240 may receive the grant signal GRNT from the buffer management unit 110 through the first direct interface channel DI1. The grant signal receiver 240 may transfer the grant signal GRNT to one of the write direct memory accessor 211, and the read direct memory accessor 212 in response to a selection signal SEL transmitted from the first arbitrator 223. The first arbitrator 223 may enable the selection signal SEL when the write request WRCMD and the write index IDX1_1 are transmitted to the buffer management unit 110 through the first direct interface channel DI1. In other words, when the write request is transmitted, the selection signal SEL may be enabled. The grant signal receiver 240 may transfer the grant signal GRNT to the write request channel WRCH of the write direct memory accessor 211 in response to the enabled selection signal SEL. On the other hand, the first arbitrator 223 may disable the selection signal SEL when the read request RRCMD and the read index IDX1_2 are transmitted to the buffer management unit 110 through the direct interface channel DI1. In other words, when the read request is transmitted, the selection signal SEL may be disabled. The grant signal receiver 240 may transfer the grant signal GRNT to the read request channel RRCH of the read direct memory accessor 212 in response to the disabled selection signal SEL.

Figure 11:
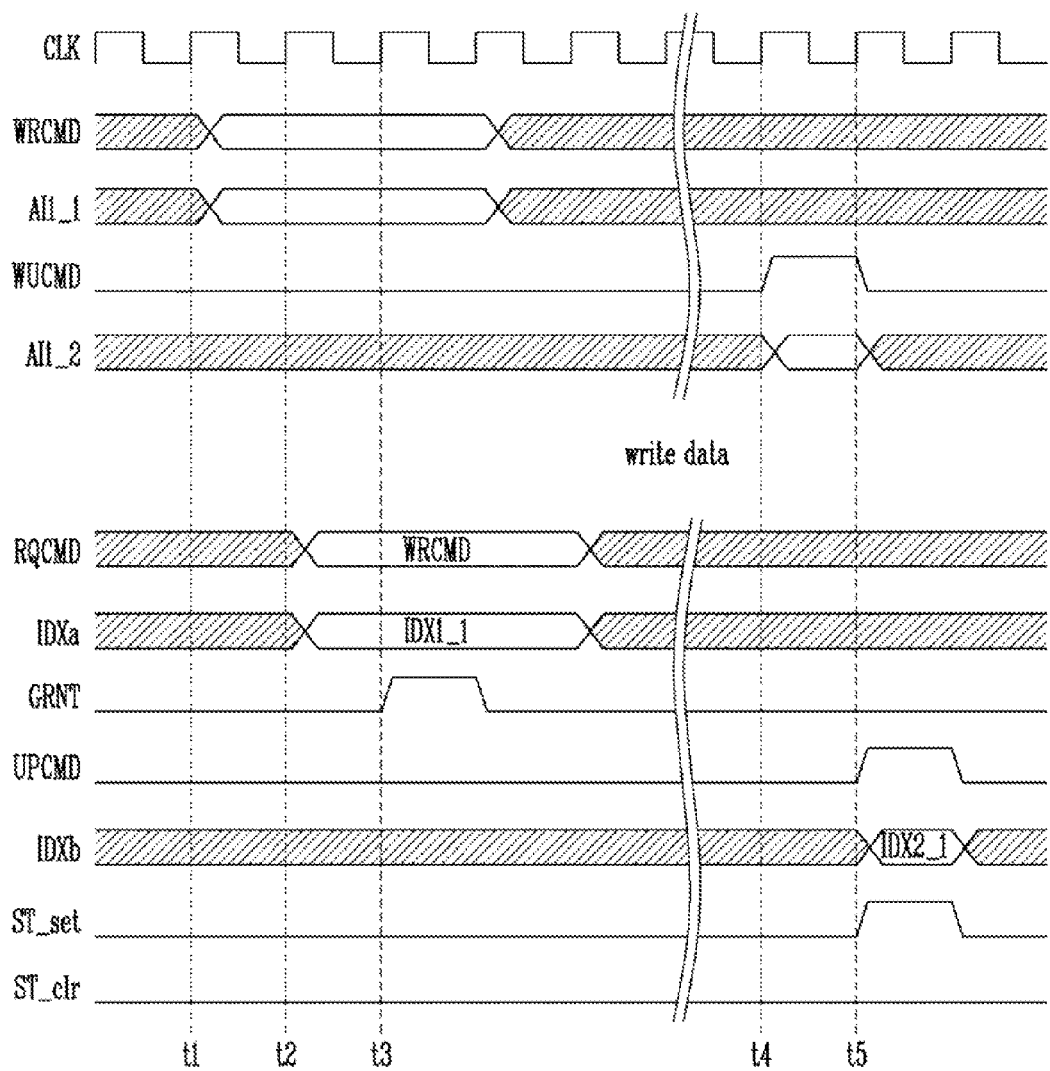
FIG. 11 is a timing diagram illustrating operations of the direct memory access unit, and the buffer request during a write operation of the buffer memory.

FIG. 11 is a timing diagram illustrating operations of the direct memory access unit DMA1, and the buffer requester BR1 during a write operation of the buffer memory 160.

Referring to FIGS. 10 and 11, the direct memory access unit DMA1, and the buffer requester BR1 may operate on the basis of a clock signal CLK.

At a first time point t1, the write direct memory accessor 211 may generate and transmit the write request WRCMD and the write area information AI1_1. The first address decoder 221 may decode the write area information AI1_1 to generate the write index IDX1_1, and transmit the write request WRCMD and the write index IDX1_1 to the first arbitrator 223.

At a second time point t2, the first arbitrator 223 may transmit the write request WRCMD as the request RQCMD, and transmit the write index IDX1_1 as the output index IDXa.

The buffer management unit 110 may consult the status value corresponding to the write index IDX1_1 among the indexes IDX1 to IDXn in the buffer management table BMT to confirm the validity of data stored in the storage area of the buffer memory 160 indicated by the write index IDX1_1 included in the request of access, and provide the grant signal GRNT with reference to the status value and an ownership value corresponding to the detected index IDX1_1.

At a third time point t3, the grant signal GRNT may be enabled. In response to the enabled grant signal GRNT, the write direct memory accessor 211 may interrupt transmission of the write request WRCMD and the write area information AI1_1, and write data to the storage area corresponding to the write index IDX1_1 in the buffer memory 160.

After the write operation to the storage area corresponding to the write index IDX1_1 in the buffer memory 160 is completed, at a fourth time point t4, the write direct memory accessor 211 may enable the write update command WUCMD, and transmit the update area information AI1_2. The third address decoder 231 may decode the update area information AI1_2 to generate the update index IDX2_1, and transmit the write update command WUCMD and the update index IDX2_1 to the first queue 233.

At a fifth 5 time point t5, the second arbitrator 235 may enable the update command UPCMD in response to the write update command WUCMD from the first queue 233, and transmit the update index IDX2_1 as the output index IDXb. The second arbitrator 235 may enable the set signal ST_set.

The buffer management unit 110 may consult the status value corresponding to the update index IDX2_1 among the indexes IDX1 to IDXn in the buffer management table BMT to change the status value corresponding to the update index IDX2_1. Since the set signal ST_set is enabled, the status value may be changed to '1.' The ownership value may be changed to '00.'

Figure 12:
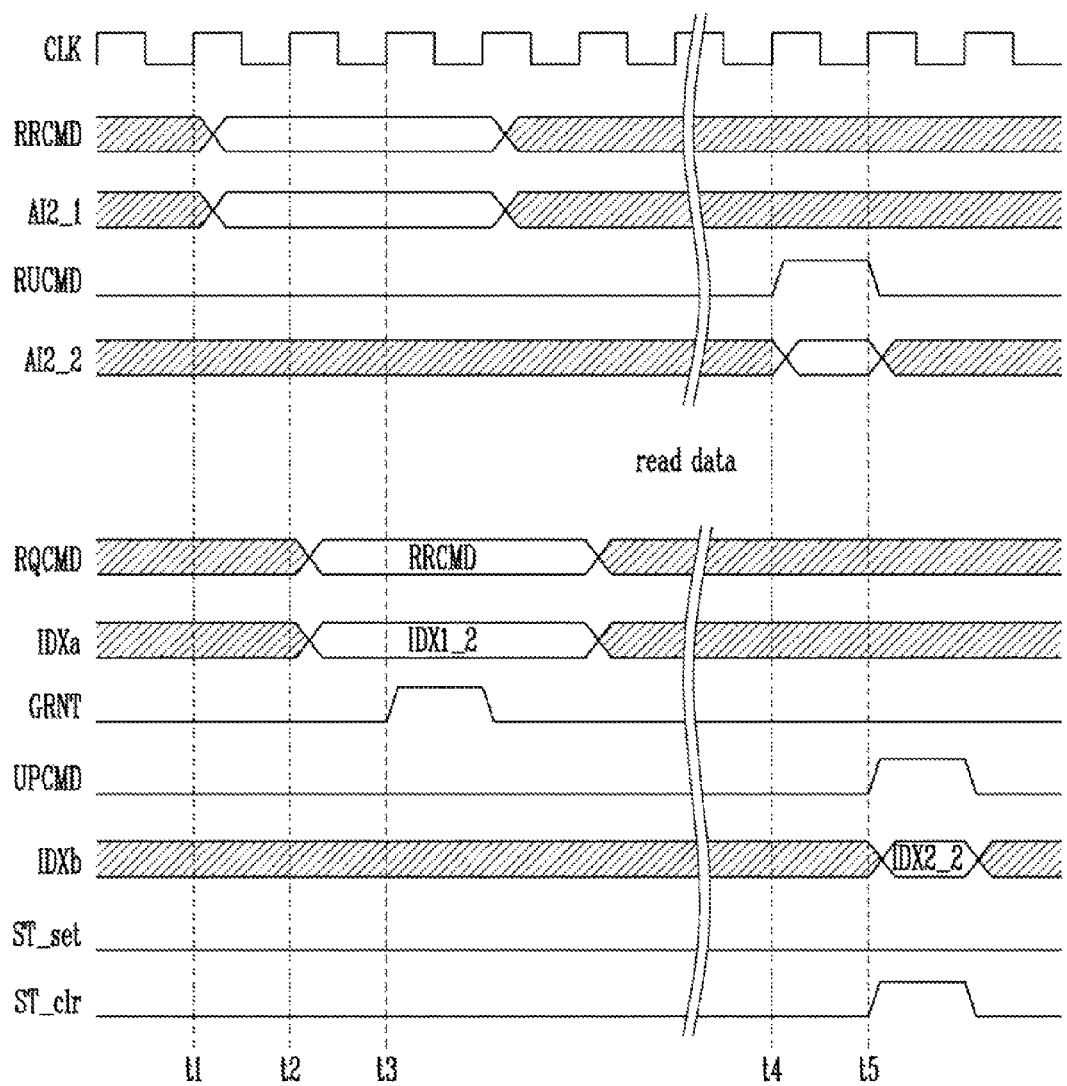
FIG. 12 is a timing diagram illustrating operations of the direct memory access unit, and the buffer request during a read operation of the buffer memory.

FIG. 12 is a timing diagram illustrating operations of the direct memory access unit DMA1, and the buffer requester BR1 during the read operation of the buffer memory 160.

Referring to FIGS. 10 and 12, at a first time point t1, the read direct memory accessor 212 may generate and transmit the read request RRCMD and the read area information AI2_1. The second address decoder 222 may decode the read area information AI2_1 to generate the read index IDX1_2, and provide the read request RRCMD and the read index IDX1_2 to the first arbitrator 223.

At a second time point t2, the first arbitrator 223 may transmit the read request RRCMD as the request RQCMD and transmit the read index IDX1_2 as the output index IDXa.

The buffer management unit 110 may consult the status value corresponding to the write index IDX1_2 among the indexes IDX1 to IDXn in the buffer management table BMT to confirm the validity of data stored in the storage area of the buffer memory 160 indicated by the write index IDX1_2 included in the request of access, and provide the grant signal GRNT on the basis of the status value and an ownership value corresponding to the detected index IDX1_2.

At a third time point t3, the grant signal GRNT may be enabled. In response to the enabled grant signal GRNT, the read direct memory accessor 212 may read data from the storage area corresponding to the read index IDX1_2 in the buffer memory 160.

After the read operation to the storage area corresponding to the read index IDX1_2 in the buffer memory 160 is completed, at the fourth time point t4, the read direct memory accessor 212 may enable the read update command RUCMD, and transmit the update area information AI2_2. The fourth address decoder 232 may decode the update area information AI2_2 to generate the update index IDX2_2, and transmit the read update command RUCMD and the update index IDX2_2 to the second queue 234.

At a fifth time point t5, the second arbitrator 235 may enable the update command UPCMD in response to the read update command RUCMD from the second queue 234, and transmit the update index IDX2_2 as the output index IDXb. In addition, the second arbitrator 235 may enable the clear signal ST_clr.

The buffer management unit 110 may consult the status value corresponding to the update index IDX2_2 among the indexes IDX1 to IDXn in the buffer management table BMT to change the status value corresponding to the update index IDX2_2 in the buffer management table BMT in response to the update command UPCMD. The status value may be changed to '0' in response to the enabled clear signal ST_clr. The ownership value may be changed to '00.'

Figure 13:
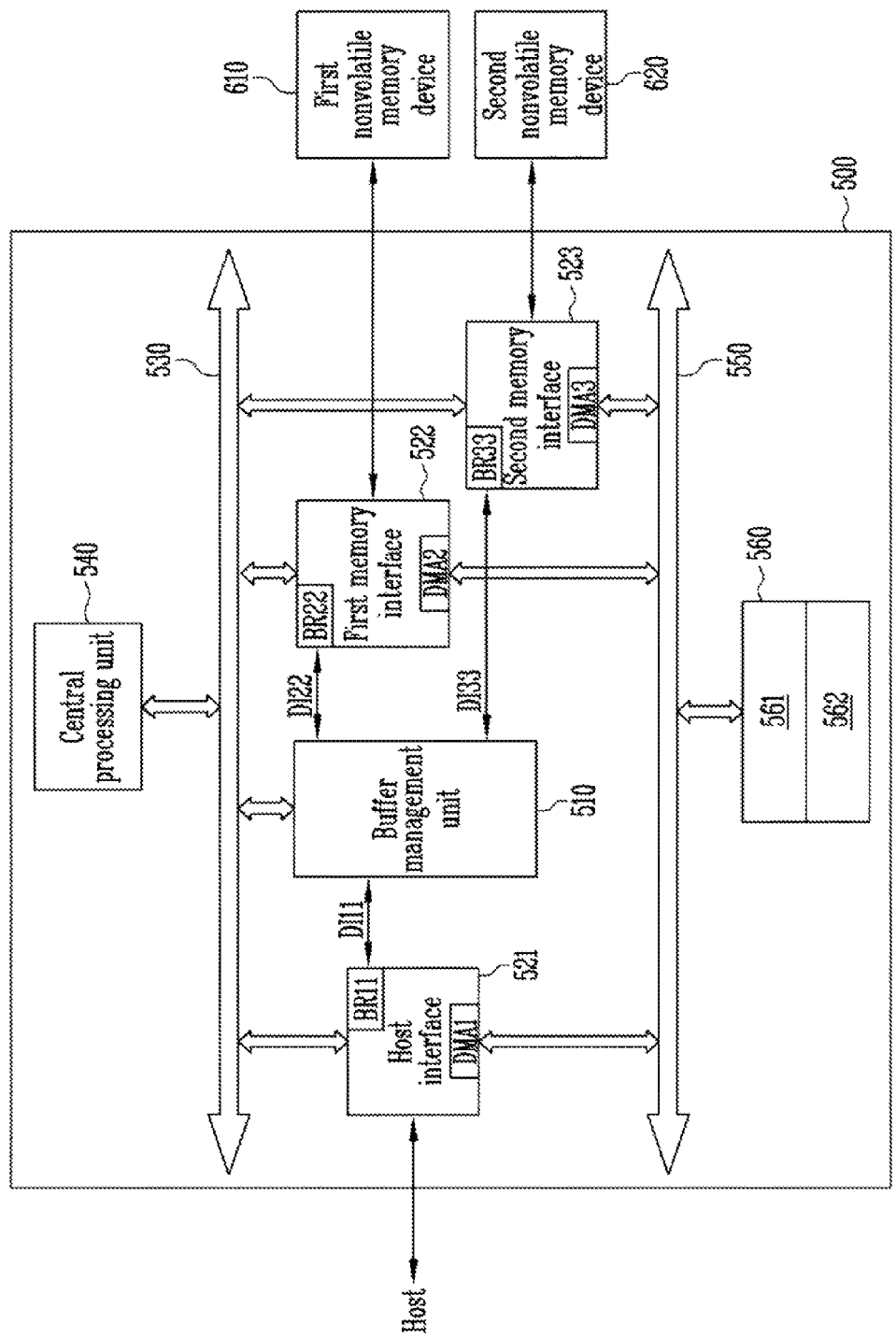
FIG. 13 is a block diagram illustrating a semiconductor device according to another embodiment of the present invention.

FIG. 13 is a block diagram illustrating a semiconductor device 500 according to another embodiment of the present invention.

Referring to FIG. 13, the semiconductor device 500 may include a buffer management unit 510, a host interface 521, first and second memory interfaces 522 and 523, a control bus 530, a central processing unit 540, a data bus 550, and a buffer memory 560. The first, second and third function blocks 121, 122 and 123 described with reference to FIG. 1 may correspond to the host interface 521, the first memory interface 522 and the second memory interface 523, respectively.

The buffer memory 560 may be divided into a write buffer memory 561 and a read buffer memory 562.

The write buffer memory 561 may temporarily store data from a host Host. The data temporarily stored in the write buffer memory 561 may be eventually stored in nonvolatile memory devices 610 and 620 through the memory interfaces 522 and 523, respectively.

The read buffer memory 562 may temporarily store data from the nonvolatile memory devices 610 and 620. The data temporarily stored in the read buffer memory 562 may be eventually output to the host Host through the host interface 521.

Figure 14:
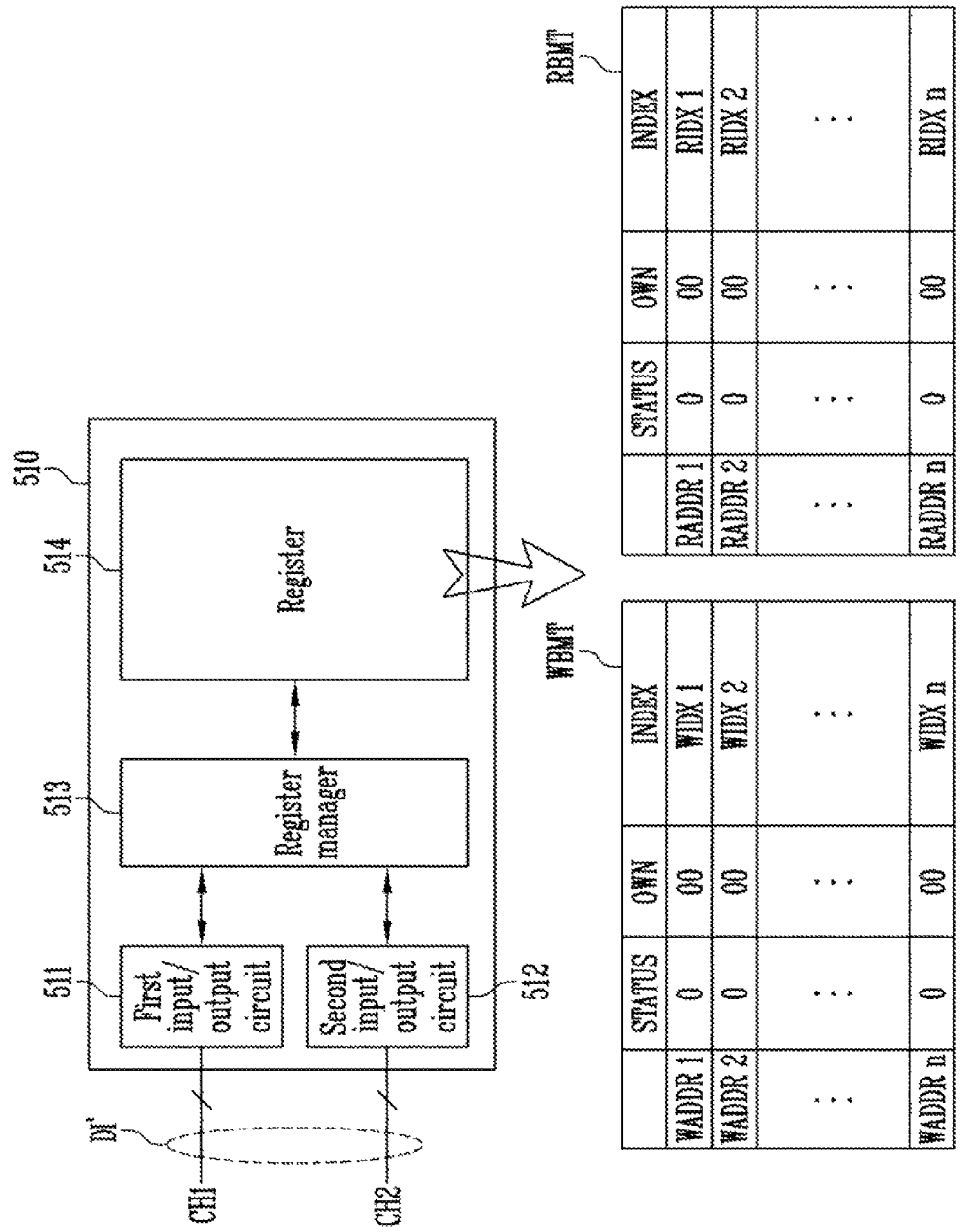
FIG. 14 is a block diagram illustrating a buffer management unit shown in FIG. 13.
Figure 15:
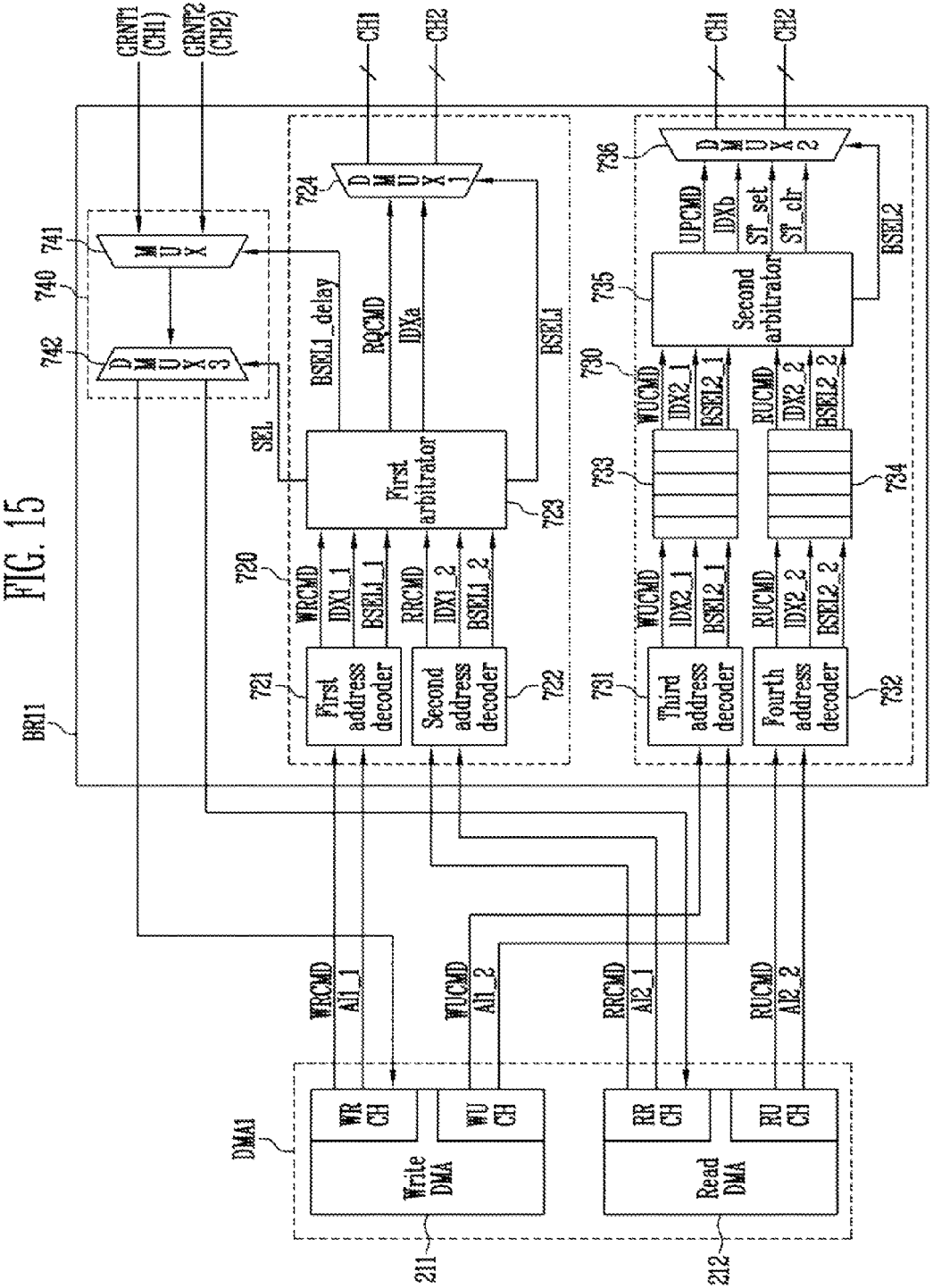
FIG. 15 is a block diagram illustrating a direct memory access unit, and a buffer requester included in each of a host interface and first and second memory interfaces shown in FIG. 13.

According to an embodiment of the present invention, each of the host interface 521 and the first and second memory interfaces 522 and 523 may transmit to the buffer management unit 510 the request of access to the write buffer memory 561 through a first channel CH1 shown in FIGS. 14 and 15. Each of the host interface 521 and the first and second memory interfaces 522 and 523 may transmit to the buffer management unit 510 the request of access to the read buffer memory 562 through a second channel CH2, shown in FIGS. 14 and 15.

The host interface 521 may communicate with the host Host. The host interface 521 may be coupled to a first direct interface channel DI11 through a first buffer requester BR11, and coupled to the data bus 550 through the first direct memory access unit DMA1.

The host interface 521 may store the data received from the host Host in the write buffer memory 561 under the control of the central processing unit 540. The host interface 521 may transmit to the buffer management unit 510 the request of access to the write buffer memory 561, and write the data to the write buffer memory 561 according to a positive response from the buffer management unit 510.

The host interface 521 may output the data stored in the read buffer memory 562 to the host Host under the control of the central processing unit 540. The host interface 521 may transmit to the buffer management unit 510 the request of access to the read buffer memory 562, and output data stored in the read buffer memory 562 to the host Host according to a positive response from the buffer management unit 510.

The first and second memory interfaces 522 and 523 may communicate with the first and second nonvolatile memory devices 610 and 620, respectively. The first memory interface 522 may be coupled to a second direct interface channel DI22 through the second buffer requester BR22, and coupled to the data bus 550 through the second direct memory access unit DMA2. The second memory interface 523 may be coupled to a third direct interface channel DI33 through the third buffer requester BR33, and coupled to the data bus 550 through the third direct memory access unit DMA3.

Each of the first and second memory interfaces 522 and 523 may store the data, which is temporarily stored in the write buffer memory 561, in the corresponding nonvolatile memory device under the control of the central processing unit 540. Each of the first and second memory interfaces 522 and 523 may transmit to the buffer management unit 510 the request of access to the write buffer memory 561, and output the data from the write buffer memory 561 to the corresponding nonvolatile memory device according to a positive response from the buffer management unit 510.

Each of the first and second memory interfaces 522 and 523 may temporarily store the data, which is read from the corresponding nonvolatile memory device, in the read buffer memory 562 under the control of the central processing unit 540. Each of the first and second memory interfaces 522 and 523 may transmit to the buffer management unit 510 the request of access to the read buffer memory 562, and write the data, which is read from the corresponding nonvolatile memory device, to the read buffer memory 562 according to a positive response from the buffer management unit 510.

FIG. 14 is a block diagram illustrating the buffer management unit 510 shown in FIG. 13.

Referring to FIGS. 13 and 14, the buffer management unit 510 may include first and second input/output circuits 511 and 512, a register manager 513, and a register 514.

The first and second input/output circuits 511 and 512 may be coupled to the first and second channels CH1 and CH2, respectively. The first and second channels CH1 and CH2 may form a direct interface channel DI'. The direct interface channel DI' may correspond to one of the first to third direct interface channels DI1 to DI3 described with reference to FIGS. 1 and 2. The direct interface channel DI' may indicate the corresponding one of the first to third direct interface channels DI11 to DI33 described above with reference to FIG. 13. The other direct interface channels may be removed for a clearer explanation.

According to an embodiment, the first channel CH1 may carry the request of access to the write buffer memory 561, and a corresponding grant signal. The second channel CH2 may carry the request of access to the read buffer memory 562, and a corresponding grant signal.

The register 514 may store a write buffer management table WBMT, and a read buffer management table RBMT. The write buffer management table WBMT may correspond to the write buffer memory 561. The read buffer management table RBMT may correspond to the read buffer memory 562.

Each of the write buffer management table WBMT, and the read buffer management table RBMT may have the same fields and values as the buffer management table BMT described with reference to FIGS. 2 to 9.

The write buffer indexes WIDX1 to WIDXn may correspond to the first to n-th write buffer addresses WADDR1 to WADDRn, respectively. The first to n-th write buffer addresses WADDR1 to WADDRn may refer to storage areas of the write buffer memory 561, respectively. The read buffer indexes RIDX1 to RIDXn may correspond to first to n-th read buffer addresses RADDR to RADDRn, respectively. The first to n-th read buffer addresses RADDR to RADDRn may indicate storage areas of the read buffer memory 562, respectively.

The register manager 513 may refer to and manage the write buffer management table WBMT according to the requests of access to the write buffer memory 561 transmitted from the host interface 521, and the first and second memory interfaces 522 and 523 through the first input/output circuit 511. For example, when receiving the request of access to the write buffer memory 561 for a write operation, the register manager 513 may consult the status value corresponding to the write buffer index, which coincides with the write index included in the request of access, among write buffer indexes WIDX1 to WIDXn in the write buffer management table WBMT to confirm the validity of data stored in the storage area of the write buffer memory 561 indicated by the write index included in the request of access. When the status value corresponding to the write buffer index is '0,' the register manager 513 may enable the grant signal. For example, when receiving the request of access to the write buffer memory 561 for read operation, the register manager 513 may consult the status value corresponding to the write buffer index, which coincides with the write index included in the request of access, among write buffer indexes WIDX1 to WIDXn in the write buffer management table WBMT to confirm the validity of data stored in the storage area of the write buffer memory 561 indicated by the write index included in the request of access. When the status value corresponding to the detected write buffer index is '1,' the register manager 513 may enable the grant signal.

The register manager 513 may refer to and manage the read buffer management table RBMT according to the requests of access to the read buffer memory 562 transmitted from the host interface 521, and the first and second memory interfaces 522 and 523 through the second input/output circuit 512. For example, when receiving the request of access to the read buffer memory 562 for a write operation, the register manager 513 may consult the status value corresponding to the read buffer index, which coincides with the write index included in the request of access, among read buffer indexes RIDX1 to RIDXn in the read buffer management table RBMT to confirm the validity of data stored in the storage area of the read buffer memory 562 indicated by the write index included in the request of access. The register manager 513 may enable the grant signal when the status value corresponding to the read buffer index is '0.' For example, when receiving the request of access to the read buffer memory 562 for a read operation, the register manager 513 may consult the status value corresponding to the read buffer index, which coincides with the read index included in the request of access, among read buffer indexes RIDX1 to RIDXn in the read buffer management table RBMT to confirm the validity of data stored in the storage area of the read buffer memory 562 indicated by the read index included in the request of access. When the status value corresponding to the detected read buffer index is '1,' the register manager 513 may enable the grant signal.

FIG. 15 is a block diagram illustrating the direct memory access unit DMA1, and the buffer requester BR11 included in each of the host interface 521 and the first and second memory interfaces 522 and 523 shown in FIG. 13. FIG. 15 shows the direct memory access unit DMA1, and the buffer requester BR11 included in the host interface 521 as an example.

Referring to FIGS. 13 to 15, the direct memory access unit DMA1 may include the write direct memory accessor 211, and the read direct memory accessor 212, which are described with reference to FIG. 10.

The buffer requester BR11 may include an access request transmitter 720, an update request transmitter 730, and a grant signal receiver 740.

The access request transmitter 720 may transmit to the buffer management unit 510 the request of access for one of the write buffer memory 561 and the read buffer memory 562 through one of the first channel CH1 and the second channel CH2 in response to a buffer selection signal BSEL1_1 for the write operation, and a buffer selection signal BSEL1_2 for the read operation.

The access request transmitter 720 may include first and second address decoders 721 and 722, a first arbitrator 723, and a first demultiplexer 724. Each of the address decoders 721 and 722 may decode the received area information AI1_1 and AI2_1 respectively transmitted from the write direct memory accessor 211, and the read direct memory accessor 212.

The first address decoder 721 may receive the write request WRCMD and the write area information AI1_1. As described above, the area information such as the write area information AI1_1 may include the start index and the index size. Further, the start index may include one or more data bits indicating one of the write buffer memory 561 and the read buffer memory 562. The first address decoder 721 may decode the write area information AI1_1 to generate the write index IDX1_1 and the buffer selection signal BSEL1_1 indicating one of the write buffer memory 561 and the read buffer memory 562. The first address decoder 721 may transfer the write request WRCMD from the write direct memory accessor 211 to the first arbitrator 723.

The second address decoder 722 may receive the read request RRCMD and the read area information AI2_1. The second address decoder 722 may decode the read area information AI2_1 including the start index and the index size to generate the read index IDX1_2 and the buffer selection signal BSEL1_2. The buffer selection signal BSEL1_2 may indicate one of the write buffer memory 561 and the read buffer memory 562. The second address decoder 222 may transfer the read request RRCMD from the read direct memory accessor 212 to the first arbitrator 723.

The first arbitrator 723 may receive the write request WRCMD, the write index IDX1_1, and the buffer selection signal BSEL1_1 from the first address decoder 721, and receive the read request RRCMD, the read index IDX1_2, and the buffer selection signal BSEL1_2 from the second address decoder 722. The first arbitrator 723 may arbitrate between the information from the first address decoder 721, and the information from the second address decoder 722. When the first arbitrator 723 receives the information from the first address decoder 721 and the information from the second address decoder 722 at the same time, the first arbitrator 723 may sequentially output the information from the first address decoder 721, and the information from the second address decoder 722 in predetermined order.

When transmitting the write request WRCMD and the write index IDX1_1 as the request RQCMD and the output index IDXa, respectively, the first arbitrator 723 may transmit the buffer selection signal BSEL1_1 as the first buffer selection signal BSEL1. In response to the first buffer selection signal BSEL1, the first demultiplexer 724 may transmit the request RQCMD and the output index IDXa to the buffer management unit 510 through one of the first channel CH1 and the second channel CH2.

When transmitting the read request RRCMD and the read index IDX1_2 as the request RQCMD and the output index IDXa, the first arbitrator 723 may transmit the buffer selection signal BSEL1_2 as the first buffer selection signal BSEL1. The first demultiplexer 724 may transmit the request RQCMD and the output index IDXa to the buffer management unit 510 through one of the first channel CH1 and the second channel CH2 in response to the first buffer selection signal BSEL1.

By the above-described method, the request of access to the write buffer memory 561 for one of the write and read operations may be transmitted to the buffer management unit 510 through the first channel CH1. Also, the request of access to the read buffer memory 562 for one of the write and read operations may be transmitted to the buffer management unit 510 through the second channel CH2.

The update request transmitter 730 may transmit the write update request to the buffer management unit 510 through one of the first channel CH1 and the second channel CH2 in response to a buffer selection signal BSEL2_1 for the write update operation, and a buffer selection signal BSEL2_2 for the read update operation.

The update request transmitter 730 may include third and fourth address decoders 731 and 732, first and second queues 733 and 734, a second arbitrator 735 and a second demultiplexer 736. Each of the address decoders 731 and 732 may decode the received area information AI1_2 and AI2_2 respectively transmitted from the write direct memory accessor 211 and the read direct memory accessor 212.

The third address decoder 731 may receive the write update command WUCMD and the update area information AI1_2. The third address decoder 731 may decode the update area information AI1_2 to generate the buffer selection signal BSEL2_1 and the update index IDX2_1, and store the generated update index IDX2_1, the buffer selection signal BSEL2_1 and the write update command WUCMD in the first queue 733.

The fourth address decoder 732 may receive the read update command RUCMD and the update area information AI2_2. The fourth address decoder 732 may decode the update area information AI2_2 to generate the update index IDX2_2 and the buffer selection signal BSEL2_2. The fourth address decoder 732 may store the generated update index IDX2_2, the buffer selection signal BSEL2_2, and the read update command RUCMD in the second queue 734. Each of the first and second queues 733 and 734 may store and output data on a first-in-first-out basis.

The second arbitrator 735 may receive the write update command WUCMD, the buffer selection signal BSEL2_1, and the update index IDX2_1 from the first queue 733, and receive the read update command RUCMD, the buffer selection signal BSEL2_2, and the update index IDX2_2 from the second queue 734. The second arbitrator 735 may arbitrate between the information from the first queue 733, and the information from the second queue 234, and generate the update command UPCMD and the output index IDXb.

The second arbitrator 735 may additionally generate and transmit the set signal ST_set and the clear signal ST_clr to the buffer management unit 510 through one of the first channel CH1 and the second channel CH2. According to an embodiment, the second arbitrator 735 may enable the set signal ST_set when transmitting the write update command WUCMD as the update command UPCMD. According to an embodiment, the second arbitrator 235 may enable the clear signal ST_clr when transmitting the read update command RUCMD as the update command UPCMD.

In this case of the set signal ST_set and the clear signal ST_clr, the buffer management unit 510 may set the corresponding status value on the basis of the set signal ST_set, and the clear signal ST_clr. When the set signal ST_set is enabled, it may mean that the write update is performed. The buffer management unit 510 may change the corresponding status value to '1' when the set signal ST_set is enabled. When the clear signal ST_clr is enabled, it may mean that the read update is performed. The buffer management unit 510 may change the corresponding status value to '0' when the clear signal ST_clr is enabled.

When outputting the write update command WUCMD and the update index IDX2_1 as the update command UPCMD and the output index IDXb, respectively, the second arbitrator 735 may transmit the buffer selection signal BSEL2_1 as the second buffer selection signal BSEL2. The second demultiplexer 736 may transmit the update command UPCMD, the output index IDXb, the set signal ST_set and the clear signal ST_clr to the first channel CH1 or the second channel CH2 in response to the buffer selection signal BSEL2_1.

When outputting the read update command RUCMD and the update index IDX2_2 as the update command UPCMD and the output index IDXb, respectively, the second arbitrator 735 may transmit the buffer selection signal BSEL2_2 as the second buffer selection signal BSEL2. The second demultiplexer 736 may transmit the update command UPCMD, the output index IDXb, the set signal ST_set and the clear signal ST_clr to the first channel CH1 or the second channel CH2 in response to the buffer selection signal BSEL2_2.

The grant signal receiver 740 may include a multiplexer 741 and a third demultiplexer 742. The multiplexer 741 may select the grant signal GRNT1 transmitted through the first channel CH1 or the grant signal GRNT2 transmitted through the second channel CH2. The first arbitrator 723 may delay the first buffer selection signal BSEL1 to provide a delayed buffer selection signal BSEL1_delay. The multiplexer 741 may transmit one of the grant signals GRNT1 and GRNT2 to the third demultiplexer 742 in response to the delayed buffer selection signal BSEL1_delay.

The third demultiplexer 742 may transfer the grant signal from the multiplexer to one of the write direct memory accessor 211, and the read direct memory accessor 212 through one of the write request channel WRCH and the read request channel RRCH in response to the selection signal SEL from the first arbitrator 723. The first arbitrator 723 may enable the selection signal SEL when the write request WRCMD and the write index IDX1_1 are transmitted to the buffer management unit 510 through the first direct interface channel DI1. In other words, when the write request is transmitted, the selection signal SEL may be enabled. The third demultiplexer 742 may transfer the grant signal from the multiplexer 741 to the write request channel WRCH of the write direct memory accessor 211 in response to the enabled selection signal SEL. On the other hand, the first arbitrator 723 may disable the selection signal SEL when the read request RRCMD and the read index IDX1_2 are transmitted to the buffer management unit 110 through the direct interface channel DI1. In other words, when the read request is transmitted, the selection signal SEL may be disabled. The third demultiplexer 742 may transfer the grant signal from the multiplexer 741 to the read request channel RRCH of the read direct memory accessor 212 in response to the disabled selection signal SEL.

Figure 16:
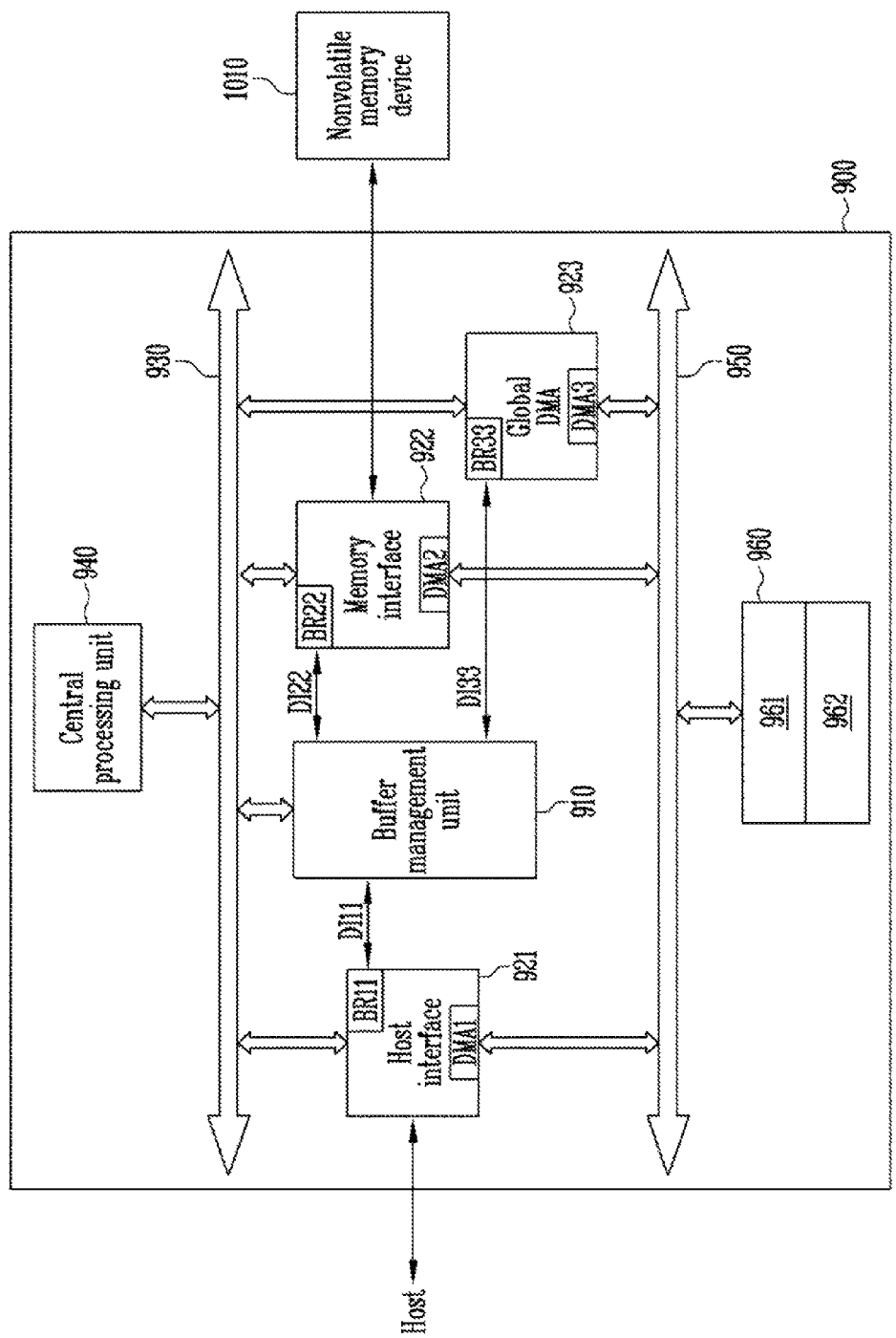
FIG. 16 is a block diagram illustrating a semiconductor device according to another embodiment of the present invention.

FIG. 16 is a block diagram illustrating a semiconductor device 900 according to another embodiment of the present invention.

Referring to FIG. 16, the semiconductor device 900 may include a buffer management unit 910, a host interface 921, a memory interface 922, a global DMA 923, a control bus 930, a central processing unit 940, a data bus 950 and a buffer memory 960 having a write buffer memory 961 and a read buffer memory 962.

The semiconductor device 900 shown in FIG. 16 may be the same as the semiconductor device 500 described with reference to FIGS. 13 to 15 except for the difference between the second memory interface 523 and the global DMA 923. The second memory interface 523 may access the second nonvolatile memory device 620 for the write and read operations while the global DMA 923 may access the buffer memory 960 for the write and read operations. The first, second and third function blocks 121, 122 and 123 described with reference to FIG. 1 may correspond to the host interface 921, the memory interface 922 and the global DMA 923, respectively. The memory interface 922 may communicate with a nonvolatile memory device 1010.

The global DMA 923 may access the buffer memory 960 through the data bus 950 under the control of the central processing unit 940. For example, the global DMA 923 may move the data from the write buffer memory 961 to the read buffer memory 962, and vice versa. The global DMA 923 may read the data from the write buffer memory 961 or the read buffer memory 962, and write the read data to the read buffer memory 962 or the write buffer memory 961.

The global DMA 923 may transmit to the buffer management unit 910 the request of access to the write buffer memory 961 through the first channel CH1. Also, the global DMA 923 may transmit to the buffer management unit 910 the request of access to the read buffer memory 962 through the second channel CH2. The first and second channels CH1 and CH2 are described with reference to FIGS. 14 and 15.

The global DMA 923 may transmit to the buffer management unit 910 the request of access to the write buffer memory 961 or the read buffer memory 962, and access the write buffer memory 961 or the read buffer memory 962 according to a positive response from the buffer management unit 910. The response as to whether the global DMA 923 can access the write buffer memory 961 may be transmitted through the first channel CH1 of the direct interface channel DI33. The response as to whether the global DMA 923 can access the read buffer memory 962 may be transmitted through the second channel CH2 of the direct interface channel DI33.

For example, through the first channel CH1, the global DMA 923 may transmit to the buffer management unit 910 the request of access to the write buffer memory 961 for the read operation, and read data from the write buffer memory 961 according to the positive response from the buffer management unit 910. In addition, through the second channel CH2, the global DMA 923 may transmit to the buffer management unit 910 the request of access to the read buffer memory 962 for the write operation, and write the read data to the read buffer memory 962 according to the positive response from the buffer management unit 510.

According to an embodiment of the present invention, since a plurality of function blocks efficiently access a buffer memory, operation speed of a semiconductor device may be improved.

What is claimed is:

1. A semiconductor device, comprising:
   a buffer memory including a plurality of storage areas;
   a plurality of function blocks, each of which transmits a request of access to the buffer memory, and accesses the buffer memory in accordance with a response to the request of access; and
   a buffer management unit configured to receive the request of access, and to transmit the response to the request of access in accordance with a status of the buffer memory,
   wherein the buffer management unit includes a buffer management table representing statuses of the plurality of storage areas,
   wherein the request of access includes a request for a write operation to one or more of the plurality of storage areas, and write indexes of the one or more of the plurality of storage areas, and
   wherein the buffer management unit confirms validity of data stored in the storage areas corresponding to the write indexes by consulting the statuses of the buffer management table corresponding to the write indexes, and transmits a grant signal as the response in accordance with the validity of data.

2. The semiconductor device of claim 1, further comprising a central processing unit suitable for controlling the buffer management unit and the plurality of function blocks.

3. The semiconductor device of claim 1, further comprising a data bus coupled to the buffer memory and the plurality of function blocks, wherein a first one of the plurality of function blocks transmits the request of access for a write operation to the buffer memory through a dedicated channel, and wherein the first function block accesses the buffer memory for the write operation through the data bus.

4. The semiconductor device of claim 3, wherein a second one of the plurality of function blocks transmits the request of access for a read operation to the buffer memory through the dedicated channel, and wherein the second function block accesses the buffer memory for the read operation through the data bus.

5. The semiconductor device of claim 4, wherein the first function block is a host interface suitable for writing data from a host into the buffer memory, and wherein the second function block is a memory interface suitable for reading data from the buffer memory in order to store the read data into a nonvolatile memory device.

6. The semiconductor device of claim 4, wherein the first function block is a memory interface suitable for writing data from a nonvolatile memory device into the buffer memory, and wherein the second function block is a host interface suitable for reading data from the buffer memory in order to output the read data to a host.

7. The semiconductor device of claim 1, further comprising a data bus coupled to the buffer memory and the plurality of function blocks, wherein a first one of the plurality of function blocks transmits the request of access for a read operation to a first storage area of the buffer memory through a dedicated channel, and wherein the first function block accesses the first storage area for the read operation through the data bus.

8. The semiconductor device of claim 7, wherein the first function block transmits the request of access for a write operation to a second storage area of the buffer memory through the dedicated channel, and wherein the first function block accesses the second storage area for the write operation through the data bus.

9. The semiconductor device of claim 1, wherein the buffer management unit transmits the grant signal when the data stored in the storage areas corresponding to the write indexes is invalid.

10. The semiconductor device of claim 1, wherein the function block, which receives the grant signal, transmits a write update command and the write indexes to the buffer management unit after completion of the write operation to the one or more of the plurality of storage areas corresponding to the write indexes, and wherein the buffer management unit changes the statuses of the buffer management table corresponding to the write indexes in response to the write update command.

11. The semiconductor device of claim 1, wherein the request of access includes a request for a read operation to one or more of the plurality of storage areas, and read indexes of the one or more of the plurality of storage areas, and wherein the buffer management unit confirms validity of data stored in the storage areas corresponding to the read indexes by consulting the statuses of the buffer management table corresponding to the read indexes, and transmits a grant signal as the response in accordance with the validity of data.

12. The semiconductor device of claim 11, wherein the buffer management unit transmits the grant signal when the data stored in the storage areas corresponding to the read indexes is valid.

13. The semiconductor device of claim 11, wherein the function block, which receives the grant signal, transmits a read update command and the read indexes to the buffer management unit after completion of the read operation to the one or more of the plurality of storage areas corresponding to the read indexes, and wherein the buffer management unit changes the statuses of the buffer management table corresponding to the read indexes in response to the read update command.

14. The semiconductor device of claim 1, wherein the plurality of function blocks comprises:

a host interface suitable for communicating with a host; and a memory interface suitable for communicating with a nonvolatile memory device, and wherein the buffer memory comprises a write buffer memory and a read buffer memory.

15. The semiconductor device of claim 14, wherein the host interface transmits the request of access for a write operation to the write buffer memory, and wherein the host interface writes data from the host into the write buffer memory.

16. The semiconductor device of claim 15, wherein the memory interface transmits the request of access for a read operation to the write buffer memory, and wherein the memory interface reads data from the write memory buffer in order to store the read data into the nonvolatile memory device.

17. The semiconductor device of claim 14, wherein the memory interface transmits the request of access for a write operation to the read buffer memory, and wherein the memory interface writes data from the nonvolatile memory device into the buffer memory.

18. The semiconductor device of claim 17, wherein the host interface transmits the request of access for a read operation to the read buffer memory, and wherein the host interface reads data from the buffer memory in order to output the read data to the host.

* * * * *